US008430310B1

(12) United States Patent
Ho et al.

(10) Patent No.: US 8,430,310 B1
(45) Date of Patent: Apr. 30, 2013

(54) WIRELESS DIRECTIONAL IDENTIFICATION AND VERIFICATION USING WEARABLE ELECTRONIC DEVICES

(75) Inventors: Harvey Ho, Mountain View, CA (US); Babak Amirparviz, Mountain View, CA (US); Luis Ricardo Prada Gomez, Hayward, CA (US); Thad Eugene Starner, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/114,408

(22) Filed: May 24, 2011

(51) Int. Cl.
*G06K 9/00* (2006.01)
(52) U.S. Cl.
USPC .............................. 235/382; 382/117; 382/128
(58) Field of Classification Search .................. 235/382; 382/128, 117
See application file for complete search history.

(56) References Cited

U.S. PATENT DOCUMENTS

| 6,711,414 | B1 | 3/2004 | Lightman |
| 6,888,502 | B2 | 5/2005 | Beigel et al. |
| 7,301,529 | B2 | 11/2007 | Marvit et al. |
| 7,353,996 | B2 | 4/2008 | Goodman et al. |
| 7,362,738 | B2 | 4/2008 | Taube et al. |
| 7,394,346 | B2 | 7/2008 | Bodin |
| 7,500,747 | B2 | 3/2009 | Howell et al. |
| 2002/0042292 | A1 | 4/2002 | Hama |
| 2004/0101178 | A1 | 5/2004 | Fedorovskaya et al. |
| 2005/0068239 | A1 | 3/2005 | Fischer et al. |
| 2006/0041758 | A1 | 2/2006 | Dunn et al. |
| 2006/0115130 | A1 | 6/2006 | Kozlay |
| 2006/0123463 | A1 | 6/2006 | Yeap et al. |
| 2007/0273679 | A1 | 11/2007 | Barton |
| 2010/0066821 | A1 | 3/2010 | Rosener et al. |
| 2010/0144268 | A1 | 6/2010 | Haberli |

FOREIGN PATENT DOCUMENTS

JP 2002186022 A 6/2002

OTHER PUBLICATIONS

Martin et al., "Effect of Permittivity and Permeability of a Flexible Magnetic Composite Material on the Performance and Miniaturization Capability of Planar Antennas for RFID and Wearable Wireless Applications", IEEE Transactions on Components and Packaging Technologies, vol. 32, No. 4, Dec. 2009, pp. 849-858. Retrieved on Feb. 22, 2011 from: http://www.skyworksinc.com/downloads/press_room/published_articles/IEEE_122009.pdf.

Choi et al., "Intelligent Wearable Assistance System for Communicating with Interactive Electronic Media", ICAT 2003, Dec. 3-5, 2003. Retrieved on Feb. 22, 2011 from: http://citeseerx.ist.psu.edu/viewdoc/download?doi=10.1.1.109.3114&rep=rep1&type=pdf.

*Primary Examiner* — Daniel Hess
(74) *Attorney, Agent, or Firm* — McDonnell Boehnen Hulbert & Berghoff LLP

(57) ABSTRACT

Disclosed are systems, methods, and devices for identifying a user associated with a wearable electronic device. First, a directed electromagnetic radiation comprising an identifier associated with a user of the wearable electronic device is transmitted to a first target device. In response, a challenge signal is received requesting a verification response verifying the authenticity of the identifier. The wearable electronic device than detects a predefined user input, and responsive to receiving the challenge signal and detecting the predefined user input, transmits a challenge response corresponding to the predefined user input to a second target device. The first and second target devices may be the same device. The predefined user input may be comprise one or more sensed head movements and/or detected user input operations.

20 Claims, 10 Drawing Sheets

WIRELESS DIRECTIONAL IDENTIFICATION AND VERIFICATION USING WEARABLE ELECTRONIC DEVICES

BACKGROUND

Unless otherwise indicated herein, the materials described in this section are not prior art to the claims in this application and are not admitted to be prior art by inclusion in this section.

As people have become more security conscious, they have found it necessary to carry around numerous keys and security cards and memorize numerous passwords to allow them to open doors to their automobile, house, office, garage, and vacation home, and to enable access to other types of secured systems. New keys, cards, and passwords are constantly being added into this collection as new locks and systems are put into service. As a result, finding the right key, card, and/or password to gain access to a secured area or secured system has become difficult.

Some solutions to this problem have relied upon an omni-directional broadcast of communications signals from a portable security device to automatically un-lock doors and/or gain entry to secured systems. However, due to their omni-directional nature, such broadcasts are prone to interception and re-use by unauthorized individuals.

Accordingly, a need exists for a simplified identification and verification system which makes it possible for a user to easily open locks and/or gain entry to secured systems, without having to carry separate keys and/or cards or memorize numerous passwords for various different locks, and that allows the user to do so without use of their hands (e.g., without having to touch a key, card, security keypad, security touchscreen, or equivalent).

SUMMARY

Recent developments in wearable communication devices provide an opportunity to improve on the identification and verification process. For example, wearable systems for displaying information may utilize "heads-up" displays. A heads-up display may typically be positioned near the user's eyes to allow the user to view displayed images or information with little or no head movement. To generate the images on the display, a computer processing system may be used. Such heads-up displays have a variety of applications, such as aviation information systems, vehicle navigation systems, and video games.

One type of heads-up display is a head-mounted display. A head-mounted display can be incorporated into a pair of goggles, glasses, a headband, a helmet, or other such device that the user can wear. The display may be calibrated and aligned in the user's field of view.

In addition to a heads-up display, other types of wearable devices could also be used. Preferably, the wearable device is configured to track a field-of-view of a wearer, similar to the way that a heads-up-display tracks a direction in which a user is looking. For example, an ear piece attached to a wearer's ear may similarly track a user's field of view. Other types of wearable devices are possible as well, such as an electronic device integrated or fastened to a belt, shoes, wrists, or other body parts which generally track a direction in which a user may face. These devices may or may not be integrated with a display device. In some embodiments, they may provide a mechanism for directed electromagnetic communication with other devices, and may interface wiredly or wirelessly with other computing devices, including secured systems, to automatically unlock, login, enable, activate, or otherwise identify a user to a target electronic computing device. Potential target electronic computing devices include electronic door locks, televisions, cable boxes, personal computers, laptops, small appliances (such as coffee makers), vending machines, check-out point-of-sale (POS) devices, gas pumps, mobile phones, PDAs, and other heads-up displays, among other possibilities.

Disclosed herein are methods and devices for identifying and verifying a user associated with a wearable electronic device, including transmitting directed electromagnetic radiation comprising an identifier associated with a user of the wearable electronic device, receiving a challenge signal requesting a verification response verifying the authenticity of the identifier, detecting a predefined user input, and responsive to receiving the signal and detecting the predefined user input, transmitting a challenge response corresponding to the predefined user input to a target device. The directed electromagnetic radiation may be an electromagnetic beam having a radiation width of 120° or less in a horizontal plane. In at least one embodiment, the radiation width is 90° or less in a horizontal plane.

In one embodiment, the directed electromagnetic radiation may be a modulated infrared beam emitted from an infrared device. The infrared device may be one of a light emitting device and a laser device. In a still further embodiment, the directed electromagnetic radiation may include a laser beam emitted from a scanning laser device and scanned to form a pattern associated with the identifier. For example, the pattern may be a matrix barcode such as a QR code. Of course, the directed electromagnetic radiation may include any other type of directed electromagnetic radiation in the electromagnetic spectrum, including, for example, radio-frequency (RF) waves emitted from a directed antenna. As examples of a directed antenna, a yagi antenna, a log-periodic antenna, a corner reflector antenna, a patch antenna, or a parabolic antenna could be used, among others. Furthermore, and in addition to directed electromagnetic radiation, other types of directed wireless transmissions could be used. For example, directed acoustic energy in the human audible or inaudible range could be used. A beam forming acoustic transducer array could be used to aim the acoustic beam in a particular direction. Other types of directed wireless transmissions could be used as well.

In at least some embodiments, the predefined user input may include sensing, via one or more movement sensors, a plurality of movements of the wearable electronic device, and the challenge response may correspond to data representative of the plurality of movements. The data representative of the plurality of movements may be stored for a predetermined period of time before being transmitted to the target device, and may be intermittently transmitted for a predetermined period of time after being sensed, or for a predetermined period of time after receiving an instruction to begin intermittent transmission. By allowing a user to record the challenge response before reaching the target device in this manner, entry routines can be further obfuscated from potential eavesdroppers. The challenge response may be transmitted via the same directed electromagnetic radiation mechanism used to establish initial contact with the target device, or may be transmitted via a second transmitter (which may be omnidirectional in nature) selected from a Bluetooth transmitter, an IEEE 802.11 transmitter, a WiMAX transmitter, a ZigBee transmitter, and a cellular transmitter, among other possibilities.

In an embodiment, the directed electromagnetic radiation is a laser beam having a wavelength in the visible spectrum, and detecting the predefined user input and transmitting the challenge response includes transmitting a signal configured to activate a plurality of respectively disposed electromagnetic radiation detectors in a particular order determined by corresponding movements of the wearable electronic device. For example, visual indicators such as light emitting diodes (LEDs) may be provided next to each of a plurality of respectively disposed electromagnetic radiation detectors to provide feedback regarding when the signal from the wearable electronic device is detected, and may allow the user to accurately activate each respectively disposed electromagnetic radiation detector in a particular order in order to verify an identity and, in one example, de-activate a corresponding security system.

Potential applications of such a wearable electronic device include (i) a hands-free unlocking of an electronic security door (and, in one embodiment, the subsequent actuation of the door), (ii) a personalization of a set of television (TV) channels authorized for or associated with the identified user, (iii) a loading or setting of personalized preferences for any one of a set of small appliances (e.g., setting the darkness of a toasting for a toaster or brew strength of a coffee maker), (iv) an identification and subsequent payment at a point of sale (POS) terminal (such as a vending machine, gas-pump, or grocery-store checkout), (v) an automatic identification and login for computing devices such as personal computers, servers, PDAs, mobile phones, etc., and (vi) an identification and verification of a user's identity to other heads-up display users. Other possibilities exist as well.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to wireless directional identification and verification using a wearable electronic device. First, examples of wearable electronic device structures will be discussed, followed subsequently by discussions of their use, operation, and interactions in identity verification and authentication systems and methods.

1. Wearable Electronic Device Structures and Systems

Figure 1:
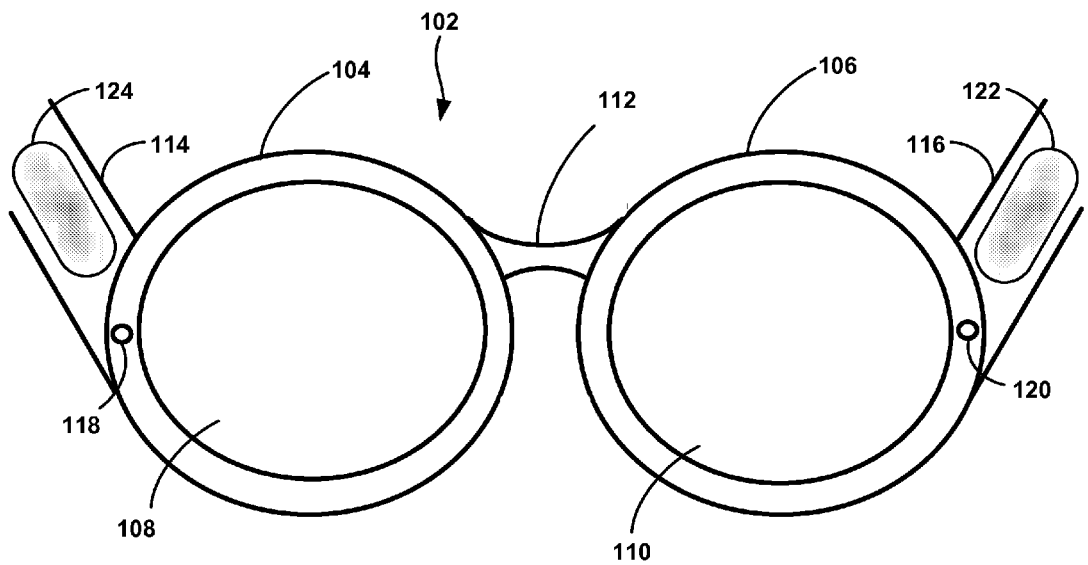
FIG. 1 shows an example embodiment of a wearable electronic device structure.

FIG. 1 shows an example embodiment of a wearable electronic device including a heads-up display. While FIG. 1 illustrates glasses 102 as an example of a wearable electronic device, other types of wearable electronic devices could additionally or alternatively be used. As illustrated in FIG. 1, glasses 102 comprise frame elements including lens-frames 104, 106, respective lens elements 108, 110, center frame support 112, two extending stems 114, 116, and touch-sensitive surfaces 122, 124. The center support 112 and the two extending stems 114 and 116 are configured to secure the glasses 102 to a user's face via a user's nose and ears, respectively. Each of the lens-frames 104, 106, center frame support 112, and stems 114, 116 may be formed of a solid structure of wood, plastic, or metal, or may be formed of a hollow structure of similar material so as to allow wiring and component interconnects to be internally routed through the glasses 102. Each of stems 114 and 116 is an example of a projection that extends away from a display element and is used to secure the display element to a user. The projection may be formed of a rigid or semi-rigid material such as wood, plastic, or metal, but may also be formed of other materials, including, for example, elastic or rubber. In addition to possibly securing the display element to a user's ear, the projection may additionally or alternatively secure the display element to the user by extending around a rear portion of the user's head, or by connecting to a head-mounted helmet structure. Other possibilities exist as well.

Disposed on the lens-frame 104 is a first electromagnetic radiation transmission device 118. Disposed on the opposite lens-frame 106 is a first electromagnetic radiation reception device 120. Although the devices 118 and 120 are illustrated on opposing sides of the glasses 102, they may be alternatively placed on a same side of the glasses 102. Furthermore, while they are shown disposed on lens-frames 104 and 106, one or both may alternatively be disposed on other frame elements of glasses 102. Additionally, while only one transmission device 118 and one reception device 120 is illustrated, some embodiments may include more than one transmission device 118 and/or more than one reception device 120. In the event multiple transmission devices are disposed on glasses 102, they may be aimed in different directions to increase the communication range of the glasses 102. Multiple reception devices 120 may be disposed to improve sensitivity, or may be disposed across multiple frame elements to increase a reception range of the glasses 102.

Figure 2:
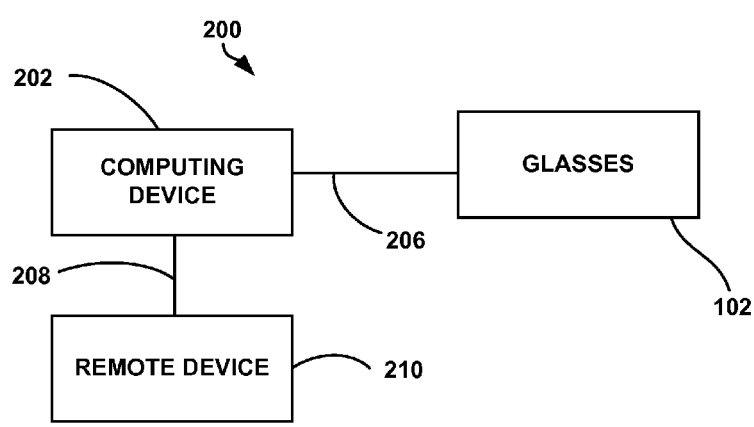
FIG. 2 shows an example embodiment of a wearable electronic device system.

FIG. 2 shows an example embodiment of a wearable electronic device system. As shown in FIG. 2, a wearable electronic device system 200 may include a wearable electronic device (such as glasses 102) coupled to a computing device 202 via a connection 206. The structure of computing device 202 will be described in more detail with respect to FIG. 11. In one embodiment, the computing device 202 may be incorporated into the glasses 102 themselves. In another embodiment, the computing device 202 may be a head-mounted computing device incorporated into, for example, a hat or helmet, or may a body-mounted computing device incorporated into, for example, a waist-mounted mobile phone or personal digital assistant. The connection 206 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or ZigBee, among other possibilities. The connection 206 may function to transmit data and/or commands to and/or from the glasses 102 for transmission and/or reception by transmission/reception devices 118, 120, and/or may function to transmit display data for display on the inside-surface of lenses 108 and/or 110.

Figure 3:
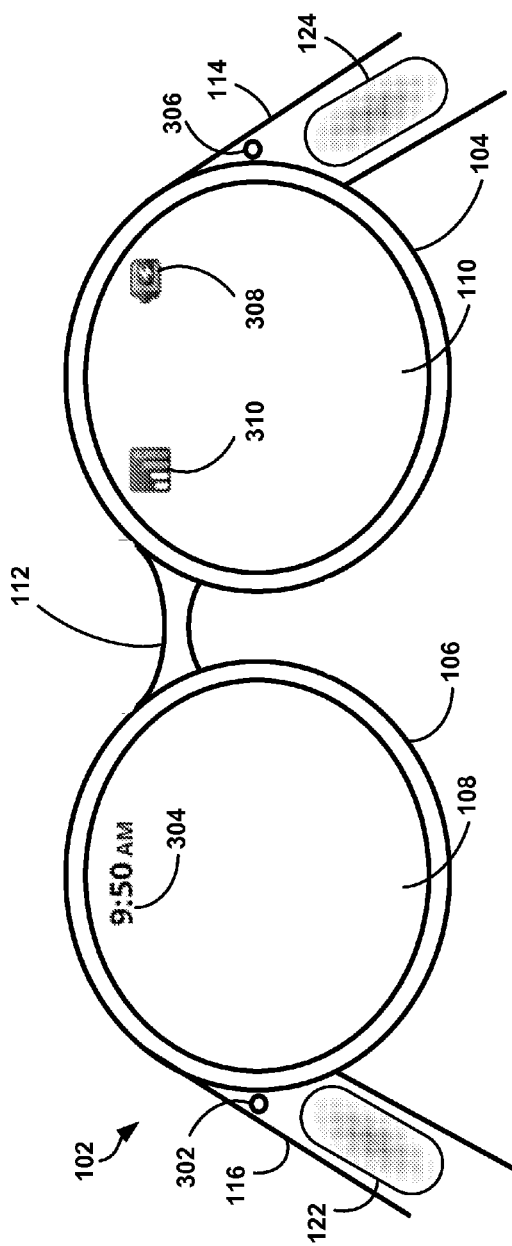
FIG. 3 shows an example embodiment of a wearable electronic device structure including a display.

FIG. 3 shows an example embodiment of a wearable electronic device structure including a display. As shown in FIG. 3, the lenses 108 and/or 110 may act as display elements. Glasses 102 may include a miniature projector 302 coupled to an inside-surface of stem 116 and configured to project a display onto an inside-surface of lens 108. For example, the projected display may include a current time 304. Additionally or alternatively, a second projector 306 may be coupled to an inside-surface of stem 114 and configured to project a display onto an inside-surface of lens 110. For example, the projected display may include a current battery-level 308 associated with the system 200. Additionally, a signal strength indicator 310 may provide a user with an indication of a signal strength being received by the receiving device 120 of the glasses 102. While indicator 310 is illustrated as providing a plurality of signal strength bars, other types of signal strength displays could be used, such as a numeric text, a line-graph, etc.

In FIG. 3, the lenses 108 and 110 act as a combiner in a light projection system, and may include a coating that reflects the light projected onto them from the projectors 302, 306. In some embodiments, a special coating may not be required (e.g., when the projectors 302, 306 are scanning laser devices). Of course, other types of display elements could also be used. For example, the lenses 108, 110 themselves may include a transparent or semi-transparent matrix display such as an electroluminescent (EL) display or liquid crystal display (LCD). A corresponding display driver may be disposed within the lens frames 104, 106 for driving such a matrix display. Alternatively or additionally, a laser or light emitting diode (LED) source and scanning system could be used to draw a raster display directly onto the retina of one or more of the user's eyes. Other possibilities exist as well.

Returning to FIG. 2, the wearable electronic device system 200 may also communicate with a remote device 210 via a connection 208. Connection 208 may be a wired and/or wireless link having one or more characteristics described above in relation to connection 206. The remote device 210 may be a device associated with the wearable electronic device system 200 (or a user thereof, not shown) or with a second wearable electronic device system (or a user thereof, not shown) with which the wearable electronic device system 200 is in communication with, and may be a mobile phone, a personal data assistant (PDA), a personal computer (PC), a laptop computer, a server device, or some other computing device. For example, the remote device 210 may be a mobile phone having Bluetooth capabilities, and may provide information for display on respective lenses 108 and/or 110, or may provide a target for transmission of data or instructions responsive to input operations received via touch-sensitive surfaces 122, 124. The connection 208 may comprise one or more base stations, routers, switches, LANs, WLANs, WANs, access points, or other network infrastructure. For example, remote device 210 may be accessible via the Internet, and may comprise a computing cluster associated with a particular web service (e.g., social-networking, photo sharing, address book, etc.).

Figure 4:
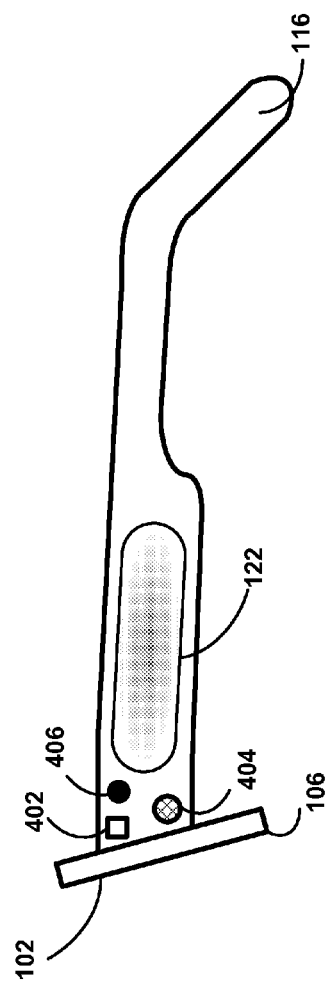
FIG. 4 shows an example embodiment of an input interface for the wearable electronic device structure of FIG. 1.

FIG. 4 shows an example embodiment of various input interfaces for glasses 102 that allows a user to interact with the glasses 102 and/or computing device 202. The input interfaces may comprise one or more of touch-sensitive surface 122, a movement sensor 402, a microphone 404, and one or more buttons or switches 406, among other possible input elements. While FIG. 4 illustrates a side-view of stem 116, additional and similar input interfaces may be provided on stem 114. For example, and as illustrated in FIG. 3, an additional touch-sensitive surface 124 may be provided on stem 114.

Returning to FIG. 4, the touch-sensitive surface 122 may sense at least one of a position and movement of a finger (or other object that provides the required change in electrostatic field, including a knuckle, hand, multiple fingers, stylus, etc.) along a planar direction relative to a surface of the touch-sensitive surface 122 (e.g., parallel to the surface of FIG. 4) via capacitive sensing, resistance sensing, and/or via a surface acoustic wave (SAW) process, among other possibilities. In addition, the touch-sensitive surface 122 may be capable of sensing movement of a finger in a direction normal to the touch-sensitive surface 122 (e.g., into the surface of FIG. 4), including sensing a level of pressure applied to the touch-sensitive surface 122. Other types of touch-sensitive surface devices could also be used. As illustrated in FIG. 4, a width of the stem 116 may be formed thicker in a region in which the touch-sensitive surface 122 is formed, and thinner in a region in which the touch-sensitive surface 122 is not formed, so as to accommodate sufficient space to detect finger movements in all planar directions (e.g., 360°), or at the very least, two pairs of diametrically opposed directions such as up, down, forward, and back.

In addition or in place of touch-sensitive surface 122, other input devices capable of detecting a position and/or movement of a reference object along a planar direction relative to a surface of the input device could also be used. Mechanical examples of such other input devices include a pointing stick, a scroll wheel, and a track ball. Optical examples of such other input devices include image capture devices such as a complementary metal-oxide-semiconductor (CMOS) or charge-coupled device (CCD) image capture device capable of detecting relative movements of a reference object through high-speed, low-resolution image capture methods. Other possibilities exist as well.

The movement sensor 402 may be provided on or in a frame element of the glasses 102, and may act as an input device configured to track a user's movements. The movement sensor 402 may include one or more of an accelerometer, a magnetometer, or a gyroscope, among other options. An accelerometer is a device that measures acceleration. Single- and multi-axis models can detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, and resonant solids to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used.

The movement sensor 402 may be used, for example, to determine when, how much, and/or how quickly, a user wearing the glasses 102 turns or moves his or her head or body to the right, left, up, or down. The sensor 402 may also be able to determine a cardinal direction in which the user is facing.

Microphone 404 may be any acoustic-to-electric transducer or sensor that converts sound into an electrical signal. For example, microphone 404 may use electromagnetic induction, capacitance change, piezoelectric generation, or light modulation, among other techniques, to produce an electrical voltage signal from mechanical vibration. The microphone 404 may communicate with a speech recognition program at computing device 202 to allow a user to speak voice commands that cause the computing device 202 to take particular action(s). The microphone 404 may also be used for other purposes.

Buttons and/or switches 406 may be used to provide additional "binary" input to the computing device 202 (e.g., "on" or "off," "pushed" or "not pushed," etc.). For example, a user may push a button to select an option displayed on one or more of the lenses 108, 110. Alternatively or additionally, an on/off switch may allow the user to turn any display on the lenses 108, 110 on and off. Other uses are possible as well.

While one touch-sensitive surface 122, one movement sensor 402, one microphone 404, and one button/switch 406 is illustrated in FIG. 4, in some embodiments a subset of these devices may be provided. In at least one embodiment, a plurality of touch-sensitive surfaces may be disposed on the stem 116 and/or the stem 114. In another embodiment, an array of (same or different) microphones or array of (same or different) movement sensors may be provided on the stem 116 and/or the stem 114. In an embodiment, a plurality of buttons and/or switches may be provided on the stem 116 and/or the stem 114. Additionally, the touch-sensitive surface 122 and/or the touch-sensitive surface 124 may be provided having a different shape or dimensions than that shown in FIG. 4.

The input interfaces illustrated in FIG. 4 may be wiredly or wirelessly coupled to the computing device 202 (e.g., via connection 206) to allow a user to control settings and features of the wearable electronic device system 200, to initiate communications with other wearable electronic devices, to provide positioning and/or movement information from sensor 402, and/or to control and interact with displays on the lenses 108, 110.

2. Identity Verification and Authentication Systems

Figure 5:
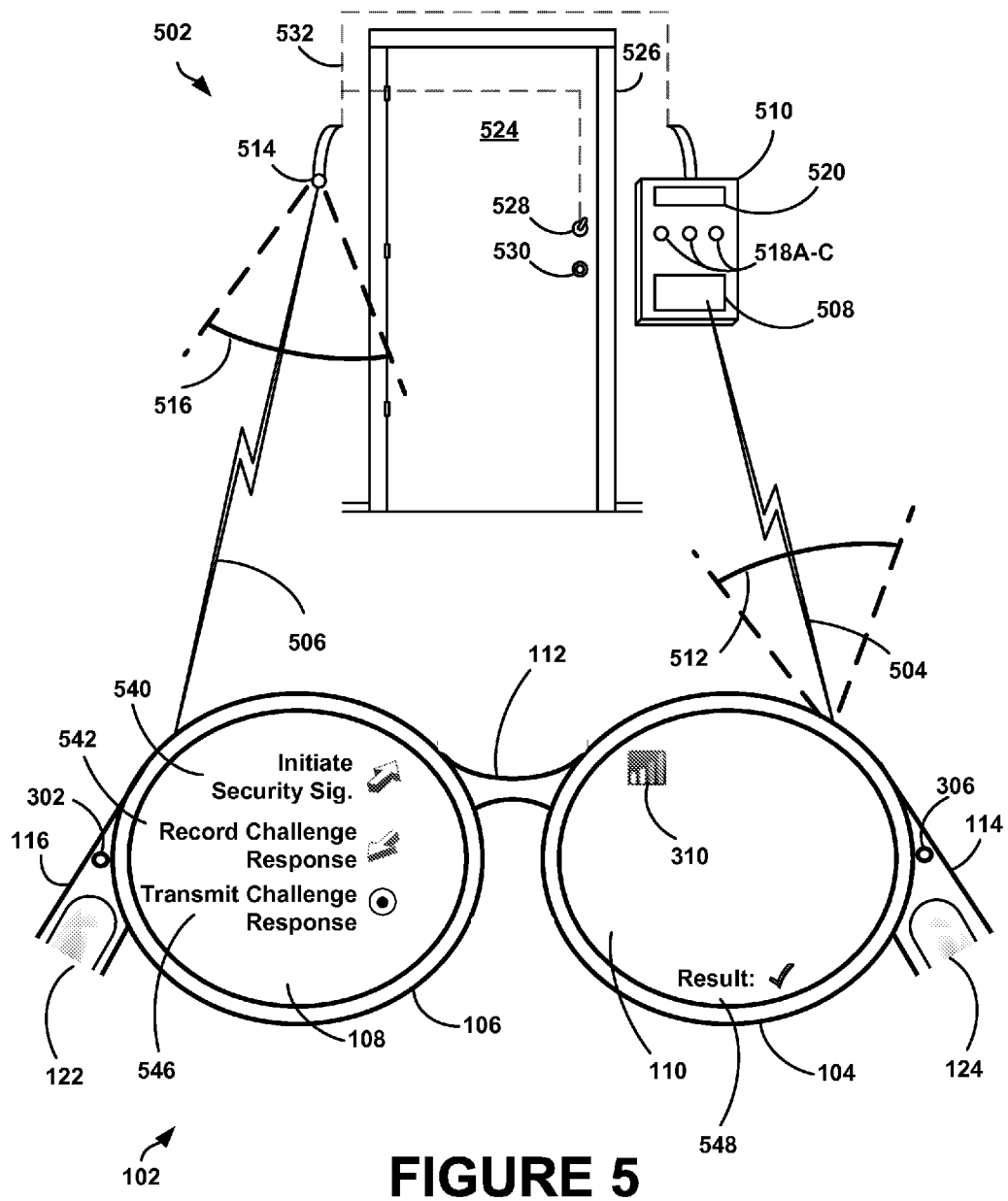
FIG. 5 illustrates an example of user identification and verification between a wearable electronic device system and a first target device.

FIG. 5 illustrates an example user identification and verification system including a wearable electronic device system and a first target device system. The wearable electronic device system of FIG. 5 includes glasses 102 (coupled to a computing system 202 not illustrated in FIG. 5) and the first target device system includes an electronic door lock security system 502. The electronic door lock security system 502 may function to control access to a restricted space. The glasses 102 may communicate with the security system 502 to wirelessly identify and authenticate a user wearing the glasses 102 in order to obtain access to the restricted space. The security system 502 and glasses 102 may cooperate to allow the user hands-free access to the restricted space, without the need to maintain and keep track of keys and/or security cards.

As illustrated in FIG. 5, a first wireless communication link 504 may be created between the electromagnetic radiation transmission device 118 (see FIG. 1) disposed on lens frame 104 of glasses 102 and an electromagnetic receiver device 508 disposed at a security box 510 of security system 502. The security box 510 includes signal strength indicators 518A-C and a display 520, and may also include a computing element (not shown) for interfacing with and controlling the electromagnetic receiver device 508, a second electromagnetic transmitter device 514, the signal strength indicators 518A-C, the display 520, and a lock 528.

The first electromagnetic radiation transmission device 118 disposed on lens frame 104 may be an infrared (IR) transmitter and the first communication link 504 may be an IR communication link. As shown by the dashed cone-shaped lines in FIG. 5, the first communication link 504 is a directional communication link having a beam width 512 of, for example, 60°. In some embodiments, the beam width may be as wide as 180°, and in other embodiments as narrow as 0.001°, or somewhere in between. An advantage of using a directional communication link to make first contact with a target device system such as the security system 502 is that the directionality of the link 504 can prevent interception of the communication link 504 by third parties, thereby increasing the security of a wireless unlocking process. Additionally, when a laser or focused LED having a wavelength in the visible spectrum is used to produce the communication link 504, the user can verify that contact is being made between the glasses 102 and the security system 502.

An IR transmitter for use as the first electromagnetic radiation transmission device 118 may include an IR LED that emits a directed light in the IR range (having a wavelength between 0.7 and 300 µm), or a semiconductor laser diode (LD) that emits a directed light within the same range. Because the light emitted from an LED is less-directed than that emitted from a laser, additional structures could be disposed within the transmission device 118 to limit the beam width of the emitted IR light from the LED. For example, the LED could be placed within a cavity in the lens frame 104 such that the surrounding frame material limits the width of emitted light from the LED. Additionally or alternatively, a lens or other structure could be provided over or around the IR transmitter to focus the light emitted from the LED. Other techniques could also be used.

Other electromagnetic wavelengths that are visible or invisible to the human eye could also be used. In one embodiment, red, blue, or green lasers may be used, for example, to provide a user with visual feedback and aid the user in aiming the communication link 504 to impact on the electromagnetic receiver device 508 disposed at the security box 510. Furthermore, radio-frequency (RF) waves (having a wavelength from approximately 3 m to $3 \times 10^4$ m) could be emitted and detected using directional antennas, such as a vagi antenna, a log-periodic antenna, a corner reflector antenna, a patch antenna, or a parabolic antenna. Furthermore, and in addition to directed electromagnetic radiation, other types of directed wireless transmissions could be used. For example, directed acoustic energy in the human audible or inaudible range (e.g., 20 Hz-200 Mhz) could be used. A beam forming acoustic transducer array could be used to aim the acoustic beam in a particular direction. Other types of directed wireless transmissions could be used as well.

The link 504 may comprise modulated electromagnetic signals modulated in accordance with data to be transmitted or broadcast to the security system 502. Data, including data identifying a user of the glasses 102, may be transmitted across the link 504 via any one or more of phase, amplitude, frequency, intensity, or pulse-width modulation, among other possibilities. In the case of IR, the link 504 may be compliant, for example, with one or more Infrared Data Association (IrDA) specifications. An effective distance (range) of the link 504 may be set by controlling the power of the electromagnetic radiation transmission device 118, applying more power to achieve farther link ranges, and less power to limit the length of the link range. In one embodiment, the power of the device 118 is controlled to limit the range of the link 504 to between 2-20 m. In some embodiments, the range may be limited to between 2-10 m in order to further increase security and/or reduce power consumption. Computing device 202 may function to control transmission characteristics of link 504 such as modulation, power, etc. The link 504 may be secured via any one of a plurality of available wireless security protocols, including but not limited to, the Temporal Key Integrity Protocol (TKIP), the Extensible Authentication Protocol (EAP), the Lightweight Extensible Authentication Protocol (LEAP), the Protected Extensible Authentication Protocol (PEAP), WiFi Protected Access (WPA), the Advanced Encryption Standard (AES), and WLAN Authentication and Privacy Infrastructure (WAPI).

In addition to communication link 504, a second communication link 506 may be established between the second electromagnetic transmitter device 514 at security system 502 and the electromagnetic receiver device 120 (see FIG. 1) disposed on lens frame 106 of glasses 102. The receiver device 120 may be an IR receiver including a photodetector capable of detecting optical signals from second communication link 510 and converting the optical signals into electrical signals for further processing by computing device 202. For example, a silicon p-i-n photodiode, a CCD, or a CMOS active pixel sensor imaging device may be used as the receiver 120 (e.g., for IR, visible-wavelength, or other types of optical signals). Other types of detectors could also be used, including, in the case of RF waves for example, an antenna, or in the case of sound waves, a transducer. Once converted to an electrical signal by the receiver device 120, the electrical signal may be provided to a demodulation circuit, such as may be embodied in computing device 202, for further processing. Similar to communication link 504, communication link 506 may be a directional communication link having a beam width 516 of, for example, 60°. In some embodiments, the beam width may be as wide as 180°, and in other embodiments as narrow as 0.001°, or somewhere in between. In one embodiment, the beam width of the communication link 506 may be wider than that of communication link 504, since the emitter 514 may not have the option to aim its emissions towards the glasses 102. In at least one embodiment, communication link 506 may be an omni-directional link based on, for example Bluetooth, IEEE 802.11, WiMAX, ZigBee, or a cellular protocol, among other options. Communication link 506 may be secured in a similar fashion to that of communication link 504.

Signal strength indicators 310 and 518A-C may be used to ensure that quality communication links 504 and 506 are maintained between the glasses 102 and security system 502. For example, a user wearing the glasses 102 may be able to observe both signal strength indicators 518A-C (indicating the strength and/or quality of the link 504 between the transmission device 118 on lens frame 104 and the receiver device 508 on security box 510), and signal strength indicator 310 (indicating the strength and/or quality of the link 506 between the transmission device 514 of security system 502 and the receiver device 120 on lens frame 106). By observing respective signal strength indicators, the user can re-direct and/or adjust the position of the glasses 102 to maximize the quality of the links 504 and 506. For example, signal strength indicators 518A-C may comprise three LEDs that illuminate based on a detected quality of the received communication link 504, such that a better signal illuminates more LEDs than a poorer signal. The user can then adjust the direction of the glasses 102 by tilting their head until the highest number of LEDs are illuminated. In at least one embodiment, a signal strength indicator on display 520 may be used instead of or in addition to signal strength indicators 518A-C. Similarly, the signals bars of the signal strength indicator 310 allows the user to adjust their location and/or direction of the glasses 102 to improve the reception of communication link 506.

Security system 502 may additionally include a door 524, a door frame 526, an electrically controllable lock 528, a door handle 530, and electrical wirings 532 connecting one or more of the security box 510, the IR transmitter 514, and the electrically controllable lock 528. Although illustrated as being incorporated in the door 524, the electrically controllable lock 528 could alternatively be disposed in the door frame 526. In either event, the electrically controllable lock 528 is under control of the control box 510, and functions to releasably secure the door 524 to the door frame 526. In the event that the door 524 is configured to automatically open upon identification and authentication of a user via security system 502, handle 530 may be eliminated.

User-input functions 540-546 displayed on lens 108 of glasses 102 illustrate example functions that may be executed by a user to operate the security system 502. An example function result 548 is displayed on lens 110. The method of operating security system 502 via glasses 102 will be described in more detail with respect to FIG. 9. FIG. 5 illustrates one example interface that may be utilized to execute the method of FIG. 9 via glasses 102. Of course, this figure is exemplary in nature only, and many other applications and combinations of input commands and associated functions are possible in light of this disclosure.

In the example illustrated in FIG. 5, either one of touch-sensitive surface 122 or touch-sensitive surface 124 may be operated, and the same input function performed by the glasses 102 in response to the input. One advantage of providing touch-sensitive surfaces 122, 124 on respective sides of glasses 102 is that the same glasses 102 may be used naturally by both left-handed and right-handed persons. In an alternative embodiment not illustrated in FIG. 5, a same input function performed on touch sensitive surfaces 122 and 124 may perform different functions. In such a case, additional symbols illustrating which of the two touch sensitive surfaces 122 and 124 a particular associated function must be performed on to effect execution of a particular function may also be displayed on lenses 108 and/or 110.

FIG. 5 illustrates a simultaneous display of different content on both lenses 108 and 110 in non-overlapping regions of the lenses in order to prevent confusing and/or disorienting the user as a result of the bi-focal human vision field and the brain's attempts to combine and make sense of the two differing overlapping displays. In the event overlapping displays are provided on lenses 108, 110, steps may be taken to prevent such confusion and/or disorientation. In one embodiment, both lenses 108, 110 may be populated with overlapping content, and a user may be expected or instructed to close one eye to focus on one of the lenses 108, 110 at a time. In another embodiment, only one of the lenses 108, 110 is configured to contain displayed information at any one time. In a further embodiment, both lenses 108, 110 may be populated, but with corresponding overlapping portions of one of the displays 108, 110 eliminated, faded, blurred, or otherwise augmented to prevent visual confusion and/or disorientation at intersecting regions of the displayed content. Other possibilities exist as well.

As illustrated in FIG. 5, user-input functions 540-546 may be projected on lens 108 by projecting device 302, and may include an Initiate Security Signal command 540, a Record Challenge Response command 542, and a Transmit Challenge Response command 546. In order to aid a user in determining how to use touch-sensitive surface 122 and/or 124 to interface with the security system 502, the user commands 540-546 may be displayed on lens 108 to inform the user of available input commands that may be executed on one or more of touch-sensitive surfaces 122 and/or 124, and of their associated functions, may be displayed on lens 108 via projecting device 302. During the time in which the user-input functions are being displayed on lens 108, any overlapping content being displayed on lens 110 may be removed from lens 110, corresponding overlapping portions augmented, or a user expected or instructed to close a corresponding eye looking through lens 110.

In this example, each of the commands 540-546 is displayed with a corresponding symbol illustrating an input operation that may be executed on one of the touch-sensitive surfaces 122 and/or 124 to execute the associated function. For example, the Initiate Security Signal command 540 may be executed by a user swiping their finger across touch-sensitive surface 124 in a forwards direction (as indicated by the forward facing arrow symbol). In response to receiving the Initiate Security Signal command 540, the computing device 202 may cause the transmission device 118 on lens frame 104 to begin transmitting an identifier identifying the user via communication link 504. The Record Challenge Response command 542 may be executed by a user swiping their finger across touch-sensitive surface 124 in a backwards direction (as indicated by the backwards facing arrow symbol). In response to receiving the Record Challenge Response command 542, the computing device 202 may cause the motion sensor 402, microphone 404, touch-sensitive surface 122, and/or buttons/switches 406 to begin recording an input pattern for transmission as a challenge response to security system 502. The Transmit Challenge Response command 546 may be executed by a user double tapping the touch-sensitive surface 124 (as indicated by the inner solid circle surrounded by an outer hollow circle symbol). In response to receiving the Transmit Challenge Response command 546, the computing device 202 may cause the transmission device 118 on lens frame 104 to begin transmitting the challenge response to the security system 502 via communication link 504. Assuming the challenge response is accepted by the security system 502, a success response message may be transmitted to the glasses 102 via communication link 506 and displayed as function result 548 (in this example, displayed as a successful result indicating an unlocking of the lock 528 on the door 524).

In at least one embodiment, the commands 540-546 may be displayed in lens 108 only upon glasses 102 detecting the proximate presence of security system 502. For example, security system 502 may intermittently or periodically broadcast a beacon signal (via communication link 506 or some other directed or omni-directional wireless protocol) that, upon detection by glasses 102, displays commands 540-546 in lens 108. In some embodiments, after displaying the commands 540-546 for some period of time (e.g., 1-5 seconds), the commands 540-546 may be removed from lens 108. Subsequently, the commands 540-546 may be displayed only upon demand (e.g., via a particular motion across touch-sensitive surface 122 and/or 124 associated with displaying available input commands, a particular area of touch-sensitive surface 122 and/or 124 associated with displaying available input commands, or an algorithm executing at computing device 202 that detects that a user is having difficulty navigating via touch-sensitive surface 122 and/or 124). Computing device 202 may detect that a user is having difficulty navigating based on a number of unrecognized movements across touch-sensitive surface 122 and/or 124, a number of times that a user "undoes" a previous command by subsequently doing the opposite, or by some other combination of input and logic.

Although particular input commands and associated function combinations are illustrated in FIG. 5, input commands and their associated functions may be modified by a user. For example, although in FIG. 5 a forward-swipe across touch-sensitive surface 122 and/or 124 is associated with initiating a security signal transmission, it may be more intuitive for some users that a single tap on touch-sensitive surface 122 and/or 124 initiates the security signal transmission. Associations between commands and associated functions may, for example, be stored in a list or database in computing device 202 and/or at remote device 210. A locally or remotely accessible interface may allow the user to access the stored list or database and modify the associations. For example, the user may be able to access the computing device 202 and/or the remote device 210 via a wired or wireless connection, and modify the Initiate Security Signal command to be associated with a single tap on touch-sensitive surface 122 and/or 124 instead of a forward-swipe. The selection of a new command may be executed by a user selecting the new command from a list, or may be executed by the user entering the new command via the touch-sensitive surface 122 and/or 124 when requested (e.g., single-tapping on the touch-sensitive surface 122 and/or 124 when requested). In this manner, unique patterns of input commands can be created by a user, and personalized per user, by recording a reference object motion pattern (such as a finger swipe) at the touch-sensitive surface 124 when requested.

Figure 6:
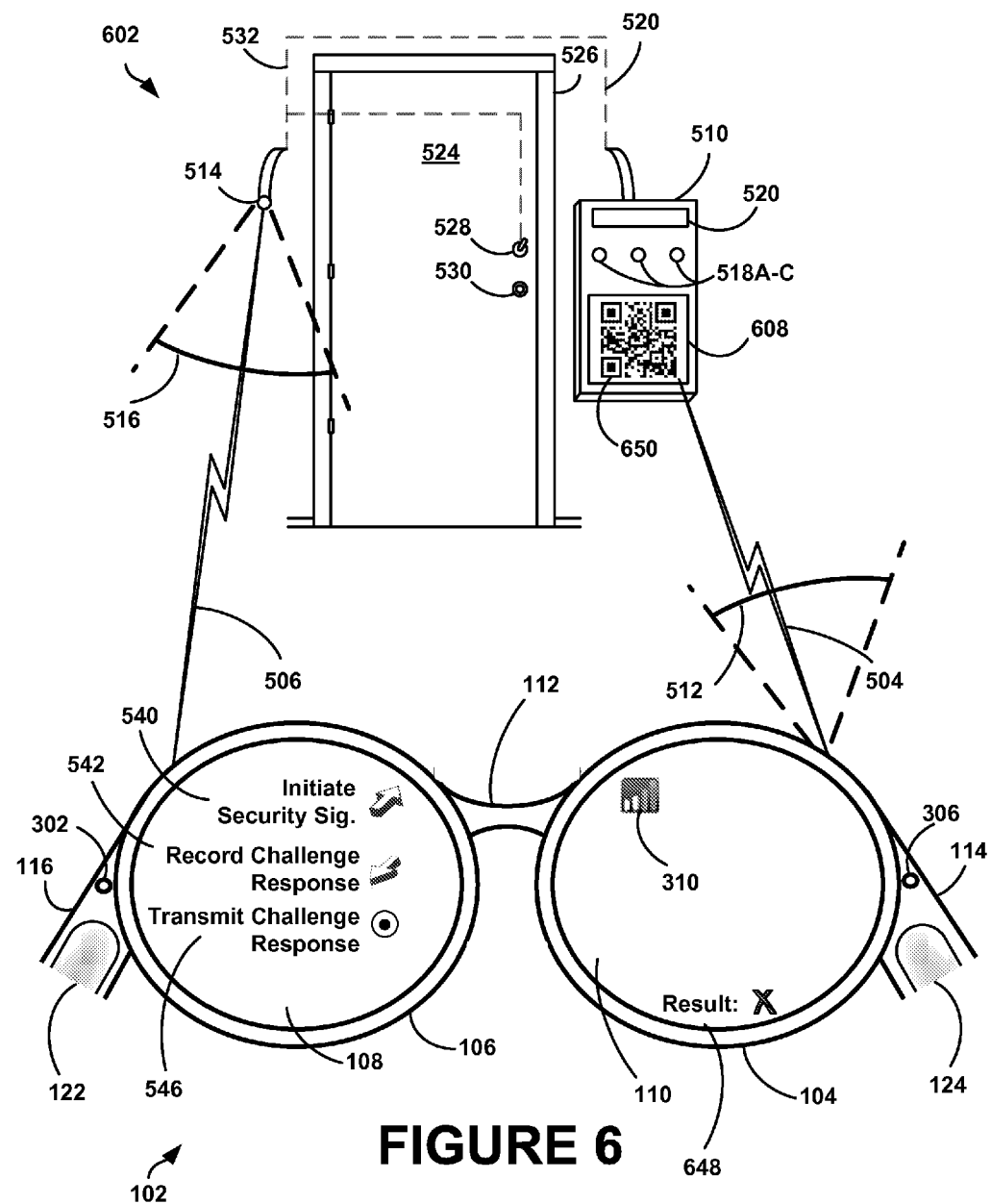
FIG. 6 illustrates an example of user identification and verification between a wearable electronic device system and a second target device.

FIG. 6 illustrates an example user identification and verification between a wearable electronic device system and a second target device system. The wearable electronic device system of FIG. 6 includes glasses 102 (coupled to a computing system 202 not illustrated in FIG. 5) and the second target device system includes an electronic door lock security system 602. The electronic door lock security system 602 may function to control access to a restricted space in a manner similar to security system 502. Elements similar to the security system 502 are identified with a same reference character as set forth in FIG. 5, and the same communication considerations and interface considerations can be applied to the glasses 102 and security system 602 of FIG. 6. In contrast to FIG. 5, however, the electromagnetic radiation transmission device 118 (see FIG. 1) disposed on lens frame 104 is a scanning laser device configured to scan a two-dimensional code 650 onto the two-dimensional code-reader 608 via directed electromagnetic communication link 604. An example of a two-dimensional code includes a quick response (QR) code, which consists of black modules arranged in a square pattern on a white background. The information encoded can be text, URL, or other data, including, for example, an identifier identifying a user of glasses 102. The term QR Code is a registered trademark of Denso Wave Incorporated, and has been approved as an ISO (International Organization for Standardization) international standard (ISO/IEC18004), the entire contents of which are incorporated herein by reference. Other types of two-dimensional (e.g., matrix) codes could be used as well, including but not limited to, Portable Data File (PDF) 417, Aztec Code, Maxi-Code, ShotCode, EZcode, InterCode, DataGlyphs, Super-Code, and VeriCode.

The two-dimensional code-reader 608 at security box 610 may include a CCD imager device, a CMOS imaging device, or some other imaging mechanism capable of reading the two-dimensional code 650 scanned from glasses 102. Embedded within the two-dimensional code 650 may be an identifier identifying a user of the glasses 102. Similar to the system 502, signal strength indicators 518A-C and/or display 520 may provide visual feedback to the user regarding the ability to read the two-dimensional code 650 and/or the strength of the communication link 604. Further communications may be executed between security system 602 and glasses 102 in a manner similar to that set forth in FIG. 5 above, and as explained in more detail with respect to FIG. 9. FIG. 6 illustrates an example identification and/or authentication failure message 648, which may be displayed on lens 110 for any number of reasons discussed in more detail with respect to FIG. 9.

Figure 7:
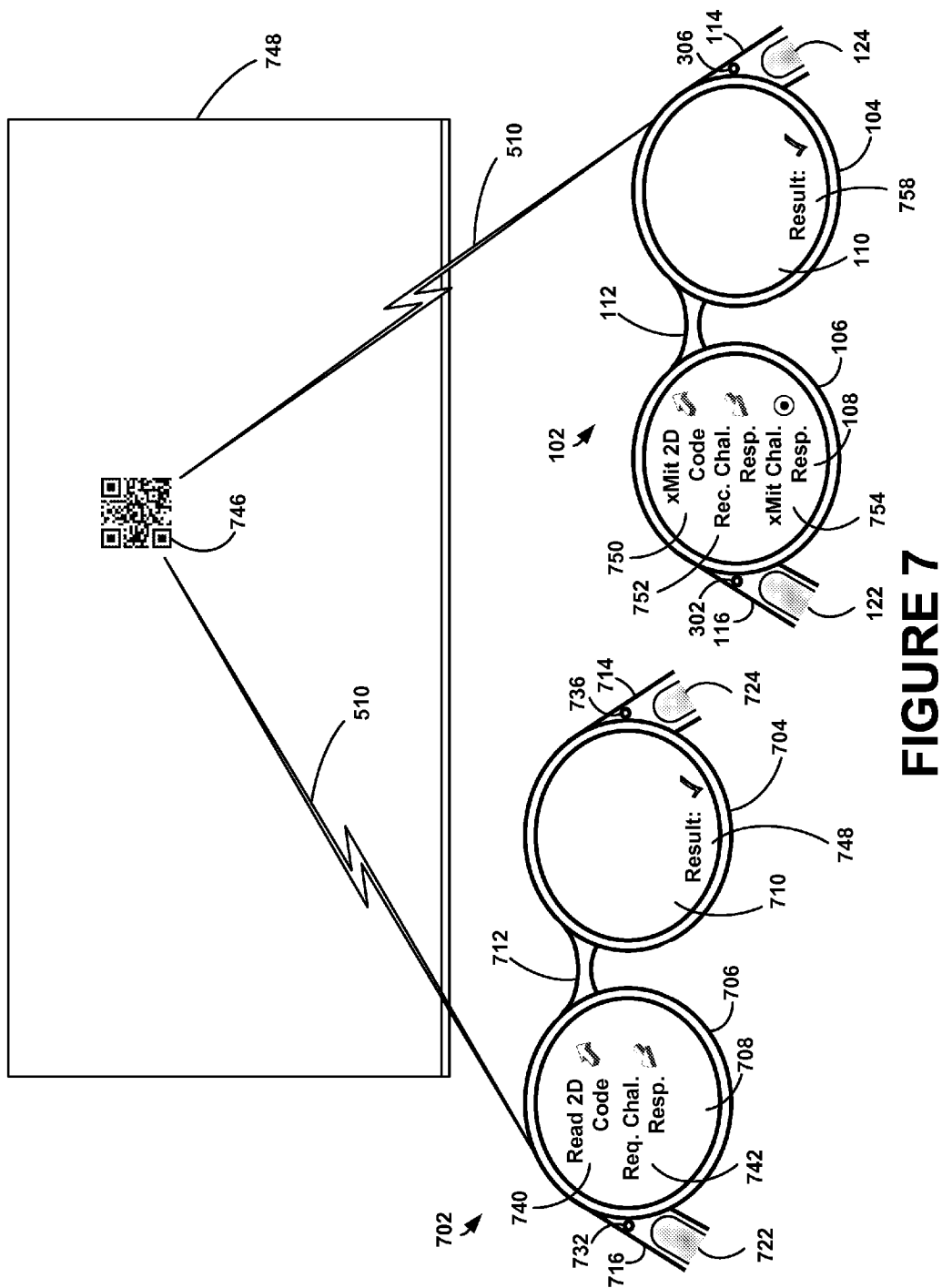
FIG. 7 illustrates an example of user identification and verification between a first wearable electronic device system and a second wearable electronic device system.

FIG. 7 illustrates a variation on the two-dimensional code reader example of FIG. 6. Instead of scanning a two-dimensional code 650 on a security box 610 to identify and authenticate a user, in an alternative embodiment illustrated in FIG. 7, a two-dimensional code 746 may be scanned on an intermediate display surface 748 for reading and authentication by a second wearable electronic device such as glasses 702. Glasses 702 may contain elements similar to glasses 102, including lens-frames 704, 706, respective lens elements 708 and 710, center frame support 712, two extending stems 714 and 716, finger-operable touch-sensitive surfaces 722, 724, and miniature projectors 732, 736 configured to project respective displays onto inside-surfaces of lenses 708, 710. Disposed on the lens-frame 704 may be a second electromagnetic radiation transmission device (not shown), and disposed on the opposite lens-frame 706 may be a two-dimensional code-reader (not shown), such as a CCD imaging device, a CMOS imaging device, or some other imaging mechanism capable of reading a two-dimensional code. Glasses 702 may interface with a computing device (not shown) similar to the computing device 202 with which glasses 102 interface with.

The method of communicating between glasses 102 and 702 will be described in more detail with respect to FIG. 10. FIG. 7 illustrates example interfaces that may be utilized at glasses 102 and 702 to execute the method of FIG. 10 via respective glasses 102 and 702. Of course, this figure is exemplary in nature only, and many other applications and combinations of input commands and associated functions are possible in light of this disclosure.

In one embodiment, user-input functions 740-742 displayed on lens 708 of glasses 702 illustrate possible functions that may be executed by a user to cause the glasses 702 to read a two-dimensional code 746 scanned onto an intermediate display surface 748. In the example illustrated in FIG. 7, either one of touch-sensitive surface 722 or touch-sensitive surface 724 may be operated, and the same input function performed by the glasses 702 in response to the input. In an alternative embodiment not illustrated in FIG. 7, a same input function performed on touch sensitive surfaces 722 and 724 may perform different functions. In such a case, additional symbols illustrating which of the two touch sensitive surfaces 722 and 724 a particular associated function must be performed on to effect execution of a particular function may also be displayed on lenses 708 and/or 710.

User-input functions 740-742 may be projected on lens 708 by projecting device 732, and may include a Read 2D Code command 740 and a Request Challenge Response command 742. In order to aid a user in determining how to use touch-sensitive surface 722 and/or 724 to interface with glasses 102, the user commands 740-742 may be displayed on lens 708 to inform the user of available input commands that may be executed on one or more of touch-sensitive surfaces 722 and 724, and of their associated functions. During the time in which the user-input functions are being displayed on lens 708, any overlapping content being displayed on lens 710 may be removed from lens 710, corresponding overlapping portions augmented, or a user expected or instructed to close a corresponding eye looking through lens 710.

In this example, each of the commands 740-742 is displayed with a corresponding symbol illustrating an input operation that may be executed on one of the touch-sensitive surfaces 722 and/or 724 to execute the associated function. For example, the Read 2D Code command 740 may be executed by a user swiping their finger across touch-sensitive surface 724 in a forwards direction (as indicated by the forward facing arrow symbol). In response to receiving the Read 2D Code command 740, the computing device associated with glasses 702 may cause the two-dimensional code-reader disposed on lens-frame 706 to read the two-dimensional code 746 displayed on intermediate display surface 748. The Request Challenge Response command 742 may be executed by a user swiping their finger across touch-sensitive surface 724 in a backwards direction (as indicated by the backwards facing arrow symbol). In response to receiving the Request Challenge Response command 742, glasses 702 may transmit a challenge request signal to glasses 102, via a second two-dimensional code scanned on surface 748 by glasses 702 or some other directed or omni-directional communication protocol. In at least one embodiment, the Request Challenge Response command 742 may be displayed only after successfully reading two-dimensional code 746, or may not be displayed at all (e.g., relying instead on an automatic transmission of a challenge request signal to glasses 102 responsive to glasses 702 reading two-dimensional code 746). FIG. 7 illustrates an example identification and/or authentication success message 758, which may be displayed on lens 710 after successfully identifying and authenticating a user associated with glasses 102.

In at least one embodiment, the commands 740-742 may be displayed in lens 708 only upon glasses 702 detecting the proximate presence of glasses 102, or, in one embodiment, only upon glasses 702 detecting the presence of a readable two-dimensional code such as code 746 within a field of view of a user associated with glasses 702. For example, glasses 102 may intermittently or periodically broadcast a beacon signal (e.g., via a directed communication link such as link 506 or via some other directed or omni-directional wireless protocol) that, upon detection by glasses 702, displays commands 740-742 in lens 708. In some embodiments, after displaying the commands 740-742 for some period of time (e.g., 1-5 seconds), the commands 740-742 may be removed from lens 708. Subsequently, the commands 740-742 may be displayed only upon demand (e.g., via a particular motion across touch-sensitive surface 722 and/or 724 associated with displaying available input commands, a particular area of touch-sensitive surface 722 and/or 724 associated with displaying available input commands, or an algorithm executing at a computing device associated with glasses 702 that detects that a user is having difficulty navigating via touch-sensitive surface 722 and/or 724). Additionally or alternatively, the computing device (not shown) associated with glasses 702 may cause the two-dimensional code-reader disposed on lens-frame 706 to intermittently or periodically scan the user's field of view for readable two-dimensional codes such as code 746 displayed on intermediate display surface 748. Commands 740-742 may be then be displayed on lens 708 only upon detecting such a readable code. Other possibilities exist as well.

User-input functions 750-754 displayed on lens 108 of glasses 102 illustrate possible functions that may be executed by a user to cause the glasses 102 to scan the two-dimensional code 746 onto the surface 748. In the example illustrated in FIG. 7, either one of touch-sensitive surface 122 or touch-sensitive surface 124 may be operated, and the same input function performed by the glasses 102 in response to the input. The intermediate display surface 748 may be any surface that can reflect the scanning light emitted by the first electromagnetic radiation transmission device 118 (see FIG. 1) disposed on the lens-frame 104 of glasses 102. The first electromagnetic radiation transmission device 118 may be, for example, a visible-light spectrum scanning laser device. The surface 748 may be, for example, a painted wall, a piece of paper, or a piece of glass or plastic, among other possibilities.

User-input functions 750-754 may be projected on lens 108 by projecting device 306, and may include a Transmit 2D Code command 750, a Record Challenge Response command 752, and a Transmit Challenge Response command 754. In order to aid a user in determining how to use touch-sensitive surface 122 and/or 124 to interface with glasses 702, the user commands 750-754 may be displayed on lens 108 to inform the user of available input commands that may be executed on one or more of touch-sensitive surfaces 122 and 124, and of their associated functions. During the time in which the user-input functions are being displayed on lens 108, any overlapping content being displayed on lens 110 may be removed from lens 110, corresponding overlapping portions augmented, or a user expected or instructed to close a corresponding eye looking through lens 110.

In this example each of the commands 750-754 is displayed with a corresponding symbol illustrating an input operation that may be executed on one of the touch-sensitive surfaces 122 and/or 124 to execute the associated function. For example, the Transmit 2D Code command 750 may be executed by a user swiping their finger across touch-sensitive surface 124 in a forwards direction (as indicated by the forward facing arrow symbol). In response to receiving the Transmit 2D Code command 750, the computing device 202 may cause the first electromagnetic radiation transmission device 118 disposed on lens-frame 104 to scan the two-dimensional code 746 on intermediate display surface 748. The Record Challenge Response command 752 may be executed by a user swiping their finger across touch-sensitive surface 124 in a backwards direction (as indicated by the backwards facing arrow symbol). In response to receiving the Record Challenge Response command 752, the computing device 202 may cause the motion sensor 402, microphone 404, touch-sensitive surface 122, and/or buttons/switches 406 (see FIG. 4) to begin recording an input pattern for transmission as a challenge response to glasses 702. The Transmit Challenge Response command 754 may be executed by a user double tapping the touch-sensitive surface 124 (as indicated by the inner solid circle surrounded by an outer hollow circle symbol). In response to receiving the Transmit Challenge Response command 754, the computing device 202 may cause the first electromagnetic radiation transmission device 118 (or some other directed or omni-directional communication device in accordance with the disclosure above) to transmit the recorded challenge response to glasses 702. In at least one embodiment, the challenge response may include a third two-dimensional code scanned on surface 748 by glasses 102 (which may encode the recorded challenge response within the two-dimensional code or which may replace the need to record a challenge response by using a static or dynamic two-dimensional code as the challenge response).

Assuming the challenge response is accepted by the glasses 702 (e.g., the computing system associated with glasses 702), a success response message may be transmitted to the glasses 102 by glasses 702 and displayed as function result 758 (in this example, displayed as a successful result indicating an identification and authentication of a user associated with glasses 102).

In at least one embodiment, the commands 750-754 may be displayed in lens 108 only upon glasses 102 detecting the proximate presence of other glasses 702. For example, glasses 702 may intermittently or periodically broadcast a beacon signal (e.g., via a directed communication link or via some other directed or omni-directional wireless protocol) that, upon detection by glasses 102, displays commands 750-752 in lens 108. In some embodiments, after displaying the commands 750-754 for some period of time (e.g., 1-5 seconds), the commands 750-754 may be removed from lens 108. Subsequently, the commands 750-754 may be displayed only upon demand (e.g., via a particular motion across touch-sensitive surface 122 and/or 124 associated with displaying available input commands, a particular area of touch-sensitive surface 122 and/or 124 associated with displaying available input commands, or an algorithm executing at a computing device associated with glasses 102 that detects that a user is having difficulty navigating via touch-sensitive surface 122 and/or 124). Other possibilities exist as well.

Figure 8:
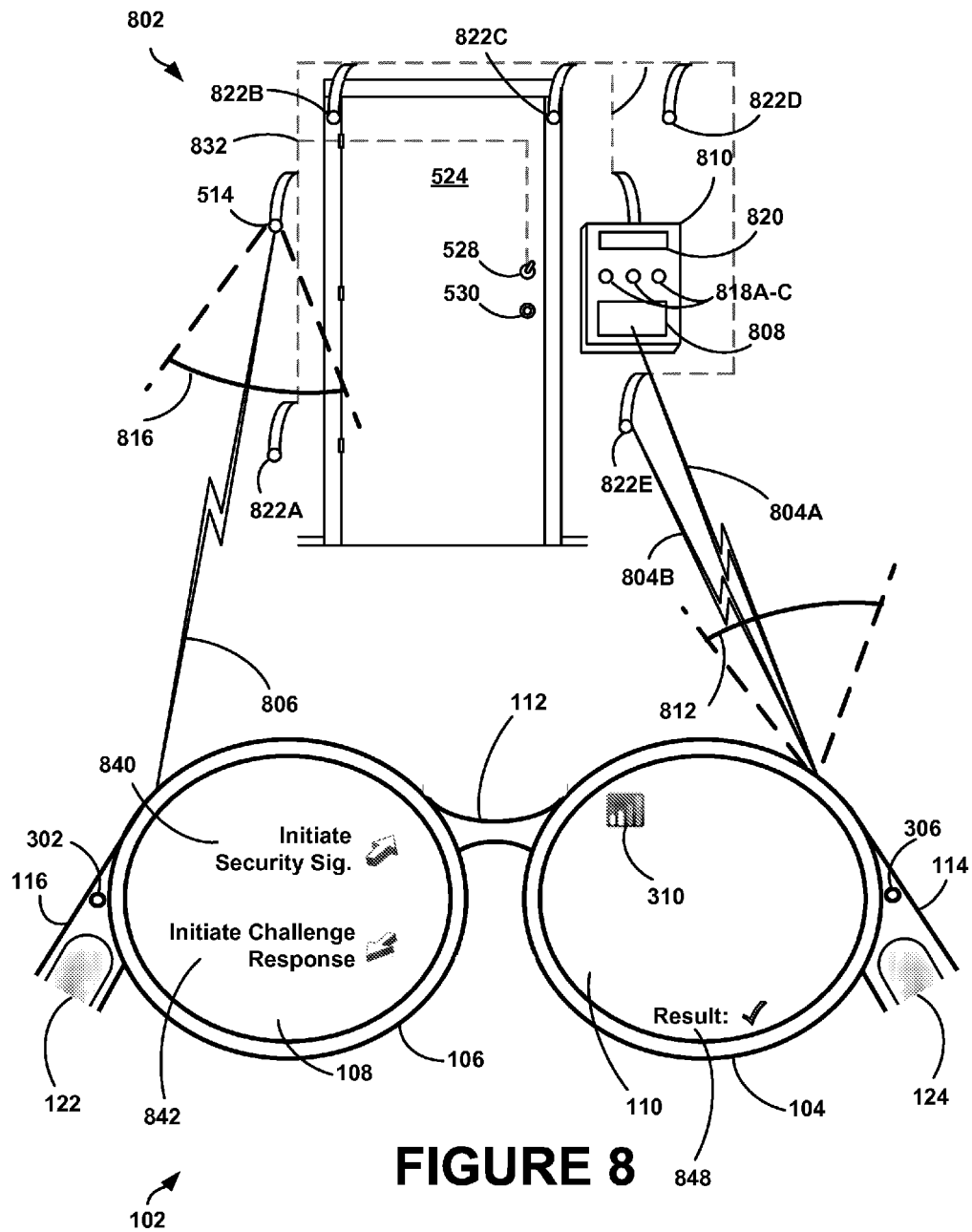
FIG. 8 illustrates an example of user identification and verification between a wearable electronic device system and a third target device.

FIG. 8 illustrates an example user identification and verification between a wearable electronic device system and a third target device system. The wearable electronic device system of FIG. 8 includes glasses 102 (coupled to a computing system 202 not illustrated in FIG. 8) and the third target device system includes an electronic door lock security system 802. The electronic door lock security system 802 may function to control access to a restricted space in a manner similar to security system 502. Elements similar to the security system 502 are identified with a same reference character as set forth in FIG. 5, and the same communication considerations and interface considerations can be applied to the glasses 102 and security system 802 of FIG. 8. In contrast to FIG. 5, however, the electromagnetic radiation transmission device 118 (see FIG. 1) disposed on lens frame 104 is a visible laser device configured to activate a plurality of photodetectors 822A-E in a particular order and may function as an initial user identification process or as a challenge response process. By using a visible laser (for example, having a wavelength falling within the visible spectrum, including but not limited to a red, blue, or green laser), the user is provided visible feedback in aiming the glasses 102 (and thus the electromagnetic radiation transmission device 118) to selectively activate the photodetectors 822A-E in a particular order.

For example, in one embodiment, the electromagnetic radiation transmission device 118 may emit a modulated radiation beam for communication link 804A (such as in FIG. 5) or a scanned laser beam for communication link 804A (such as in FIG. 6) that impinges upon an electromagnetic receiver device 808 disposed at a security box 810 to identify a user associated with the glasses 102. The electromagnetic receiver device 808 may be, for example, a silicon p-i-n photodiode, a CCD imaging device, or a CMOS imaging device, among other possibilities. In another embodiment, the electromagnetic radiation transmission device 118 may emit a modulated or un-modulated radiation beam for communication link 804B that impinges upon two or more of the plurality of photodetectors 822A-E in a particular order to identify a user associated with the glasses 102. For example, the security box 810 may include a processing device (not shown) that, when detecting a particular pattern of activations of photodetectors 822A-E via wiring 832, is configured to identify a particular user associated with the detected particular pattern. Associations between particular users and particular activation patterns may be stored at the security box 810, or may be accessible via a communication link with a remote device.

Similar to the system 502, communication links 804A and 804B may have a limited beam width 812, and signal strength indicators 518A-C and/or display 520 may provide visual feedback to the user regarding the signal strength received at electromagnetic receiver device 808 and/or photodetectors 822A-E via respective communication links 804A, 804B. Communication links 804A, 804B may have a beam width 812 of, for example, 1°. In some embodiments, the beam width 812 may be as wide as 10°, and in other embodiments as narrow as 0.001°, or somewhere in between. After identifying a user associated with glasses 102 via one or more of communication links 804A and 804B, the processing device in security box 810 may be configured to transmit a challenge signal to glasses 102 via wiring 832, the second electromagnetic transmitter device 514, and communication link 806. Communication link 806 may be a directional communication link having a beam width 816 similar to that of beam width 812. In one embodiment, the beam width of the communication link 806 may be wider than that of communication links 804A, 804B, since the emitter 514 may not have the option to aim its emissions towards the glasses 102. In at least one embodiment, communication link 806 may be an omni-directional link based on, for example Bluetooth, IEEE 802.11, WiMAX, ZigBee, or a cellular protocol, among other options. Communication link 806 may be secured in a similar fashion to that of communication link 504 described earlier.

Figure 9:
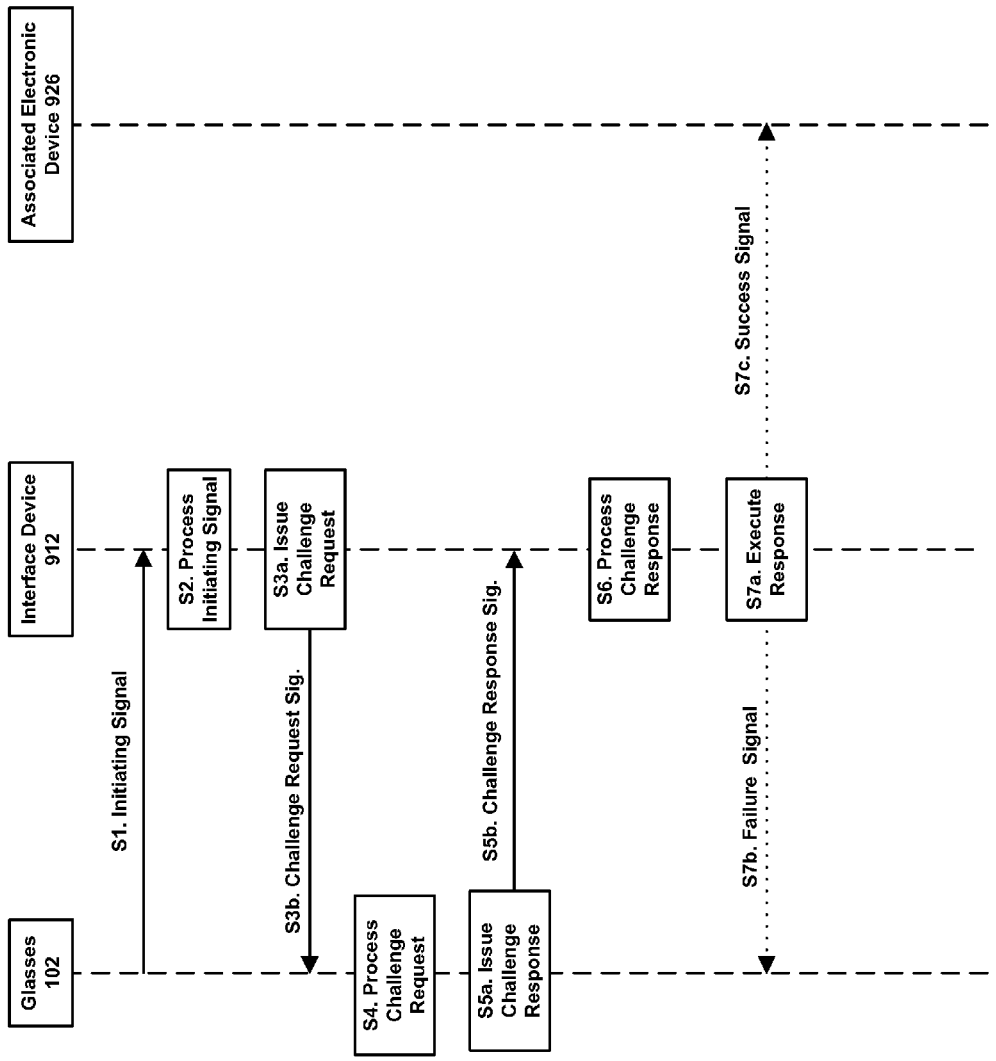
FIG. 9 illustrates an example message-flow diagram between a wearable electronic device system, an interface device, and an electronic device associated with the interface device consistent with the examples set forth in FIGS. 5, 6, and 8.

The challenge signal transmitted to glasses 102, and any further communications between security system 802 and glasses 102, may be conducted in a manner similar to that set forth in FIG. 5 above, and as explained in more detail with respect to FIG. 9, with the exception that in the embodiment illustrated in FIG. 8, the challenge response made by the user may further include using the electromagnetic radiation transmission device 118 to emit a modulated or un-modulated radiation beam for communication link 804B that impinges upon two or more of the plurality of photodetectors 822A-E in a particular order to authenticate a user associated with the glasses 102. For example, the security box 810 may include a processing device (not shown) that, when detecting a particular pattern of activations of photodetectors 822A-E via wiring 832, is configured to authenticate a particular user associated with the detected particular pattern. Associations between particular users and particular activation patterns may be stored at the security box 810, or may be accessible via a communication link and a remote device. Assuming the challenge response is accepted by the security system 802, a success response message may be transmitted to the glasses 102 via communication link 806 and displayed as function result 848 (in this example, displayed as a successful result indicating an unlocking of the lock 528 at door 524).

3. Identity Verification and Authentication Methods

Figure 10:
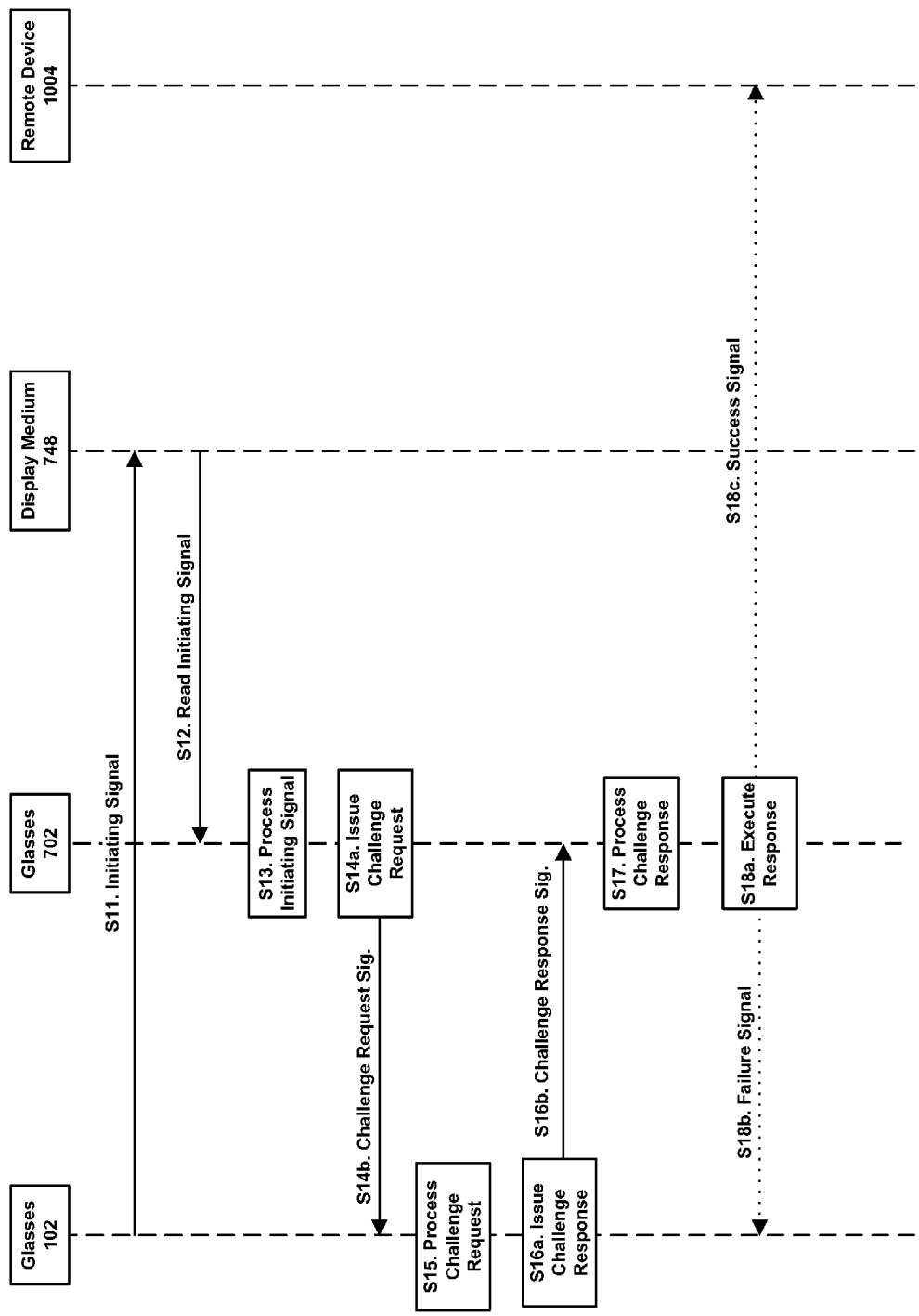
FIG. 10 illustrates an example message-flow diagram between a first wearable electronic device system, a second wearable electronic device system, and an optional remote device consistent with the example set forth in FIG. 7.

FIGS. 9 and 10 illustrate example message-flow diagrams that may implement methods of verifying and authenticating a user associated with a wearable electronic device such as glasses 102. FIG. 9 illustrates a first message-flow diagram that may be implemented between a first wearable electronic device such as glasses 102 and a target associated electronic device such as security systems 502, 602, and/or 802. FIG. 10 illustrates a second message-flow diagram that may be implemented between a first wearable electronic device such as glasses 102 and a second wearable electronic device such as glasses 702. While message-flow diagrams and associated methods are described separately with respect to FIGS. 9 and 10, it should be understood that particular attributes and functions described with respect to one of FIGS. 9 and 10 is equally applicable to corresponding attributes and functions of the other of FIGS. 9 and 10, and no limitations are intended by an absence of a description with respect to one of the FIGS. 9 and 10 that is explicitly set forth with respect to the other.

FIG. 9 illustrates a first example message-flow diagram that may be implemented between glasses 102 and a reader device 912 associated with a target electronic device 926. The interface device 912 may include a processing device such as a computer, may include a photodetector for receiving directed electromagnetic signals, such as a CMOS imaging device, CCD imaging device, or a silicon p-i-n photodiode, among other possibilities. Interface device 912 may also include a directed electromagnetic radiation transmitter or an omni-directional wireless transceiver for conducting further communications with glasses 102. The interface device 912 may be wiredly or wirelessly connected with the target electronic device 926.

The target electronic device 926 may be a security system (e.g., such as those security systems 502, 602, and/or 802 illustrated in respective FIGS. 5, 6, and 8), a television, a cable box, a personal computer, a laptop, a small appliance, a vending machine, a check-out point-of-sale (POS) device, a gas pump, a mobile phone, a PDA, another wearable electronic device, or other electronic device. Each of these associated electronic devices 926 may execute a particular function dependent upon identifying and authenticating a user associated with glasses 102. For example, and as set forth earlier, in the case of a security system the function may include unlocking and/or opening a secured entrance to a restricted area. In the case of a television, the function may include locking or un-locking a particular set of channels based on an age of an identified user and ratings associated with particular channels, or based on a preset listing of channels authorized for access by the identified user. In the case of a personal computer or laptop, the function may include automatically logging in to an operating system running on the personal computer or automatically loading applications or user-profiles associated with the identified user. In the case of a small appliance, the function may include adjusting options to a user's preferred settings (such as darkness of a toasting process, strength of a coffee brewing process, etc.). In the case of a vending machine, a check-out POS device, and a gas pump, the function may be the transfer of funds from an account associated with the user to an account associated with the vending machine, POS device, or gas pump, or the charging of an account associated with the user for purchases made via the vending machine, POS device, or gas pump. In the case of a PDA or mobile phone, the function may be the loading of a contact list or particular applications associated with the identified user. In the case of another wearable electronic device, the function may be the secure transfer of contact information or an authentication that the user is who he or she portrays themselves to be (e.g., whether the person knocking on the door is truly an employee of the local gas company). Other possibilities exist as well.

At step S1 in FIG. 9, the glasses 102 transmits an initiating signal to the interface device 912. The initiating signal is a directed electromagnetic radiation signal, which may be broadcast automatically at a regular periodic interval, at random or semi-random intervals, in response to a software or hardware-generated event at computing device 202, or in response to the user's manipulation of an input element at glasses 102, among other possibilities. For example, in response to detecting the presence of interface device 912 and/or associated target electronic device 926, glasses 102 may display an Initiate Security Signal command 540 in lens 108 of glasses 102, and in response to detecting an input operation corresponding to the command 540, begin transmitting the initiating signal at step S1.

The initiating signal may include initial information identifying a user of the glasses 102 in accordance with one or more of the methods set forth above. The initial identifying information may be, for example, a user name or password associated with the user or associated with the glasses 102, a hardware device ID associated with the glasses 102 or computing device 202, an e-mail address associated with the user, and/or a user account identifier associated with the user, among other possibilities.

Furthermore, the initiating signal (or some subsequent signal from the glasses 102) may describe additional communications capabilities of the glasses 102 that the interface device 912 may consider using in future communications with the glasses 102. For example, the glasses 102 may also transmit to the interface device 912 a Bluetooth identifier associated with the glasses 102 that the interface device 912 may use to transmit challenge signals or that the glasses 102 may use to transmit challenge responses. In an embodiment in which the glasses 102 transmits additional communications capabilities in step S1, the interface device 912 may make a determination in step S2 regarding future modes of communication with the glasses 102. For example, if the glasses 102 indicates an additional ability to communicate via Bluetooth, the interface device 912 may determine in step S2 what the best method of communication is (e.g., based on higher bandwidth, lower power consumption, etc.), and may send all subsequent communications to the glasses 102 via the determined best method.

At step S2, the interface device 912 processes the initiating signal. In response to receiving the initiating signal, the interface device 912 may identify a user associated with glasses 102, may derive a challenge request from the initiating signal or from some other source, may derive an expected challenge response from the initiating signal or from some other source, or may take some other action. The other source may be, for example, a remote authorization and authentication server (e.g., a RADIUS server) that, in response to being provided with an identifier associated with the user and derived from the initiating signal, may then provide a corresponding challenge request and expected challenge response. In one embodiment, the challenge request and challenge response may be stored locally at the interface device 912 or associated electronic device 926. In another embodiment, the challenge request and expected challenge response may be static and associated with the interface device 912 and/or the associated electronic device 926, and may not change based on an identity of a user. Other possibilities exist as well.

The interface device 912 may also access a locally or remotely stored whitelist or blacklist, using the identifier derived from the initiating signal, and use the information to determine whether to respond to the initiating signal or to discard it. For example, if the user identifier (or an associated identifier) is located in the whitelist, processing may proceed to step S3, otherwise the identifier may be discarded without responding. A blacklist would operate in a similar, but opposite, fashion.

At step S3a, the interface device 912 issues a challenge request, and at step S3b, transmits a corresponding challenge request signal to the glasses 102. The challenge request signal may be transmitted to glasses 102 via a directed electromagnetic communication link (such as via a laser or LED-based emitter) or via an omni-directional RF link (such as Bluetooth or IEEE 802.11), among other options, using additional information such as network identifiers, encryption parameters, or keys transmitted in the initiating signal in step S1. The challenge signal requests the user to authenticate themselves by providing some additional authentication information via a responsive directed or omni-directional communication.

At step S4, glasses 102 receives and processes the challenge request. In one embodiment, and in response to receiving the challenge request, glasses 102 may display a Record Challenge Response command 542 in lens 108 of glasses 102, and in response to detecting an input operation corresponding to the command 542, begin recording a challenge response. The challenge response may include a particular pattern of motions detected at motion sensor 402, a particular voice pattern recognized via microphone 404, a particular gesture pattern detected via touch-sensitive surface 122, and/or a particular pattern of button/switch 406 activations (see FIG. 4), or any combination thereof. The detected or recorded challenge response may be stored at glasses 102 for a predetermined period of time, until an input operation or some other trigger causes the recorded challenge response to be transmitted, or may be transmitted immediately. Other possibilities exist as well.

In one embodiment, the challenge response may be recorded prior to receiving the challenge request signal in step S3b, and/or prior to transmitting the initiating signal in step S12. Data representative of the challenge response may be stored for a period of time before being transmitted to the interface device 912, and may then be intermittently transmitted for a period of time after being sensed, after receiving an instruction to begin transmission at step S4, or automatically after receiving the challenge request signal at step S3b. By allowing a user to record the challenge response before coming within range of the interface device 912 and/or the associated electronic device 926, challenge response routines can be further obfuscated from potential eavesdroppers. The challenge response may be transmitted via the same directed electromagnetic radiation mechanism used to establish initial contact with the target device, or may be transmitted via a second transmitter (which may be omni-directional in nature) selected from a Bluetooth transmitter, an IEEE 802.11 transmitter, a WiMAX transmitter, ZigBee, and a cellular transmitter.

In an embodiment in which the challenge response includes a patterned activation of photodetectors 822A-E as illustrated in FIG. 8, the glasses 102 may simply activate a visible laser (e.g., the first electromagnetic radiation transmission device 118) at step S4 for use in issuing and transmitting a challenge response in step S5a and S5b.

At step S5a, the glasses 102 issues the challenge response, and at step S5b, transmits the challenge response signal to interface device 912. The challenge response signal may be associated with the challenge response recorded at step S4 (e.g., a detected movement pattern). Alternatively or additionally, the challenge response signal may include a patterned activation of each of a plurality of photodetectors 822A-E via a visible laser as illustrated in FIG. 8. Other possibilities exist as well. The challenge response signal may be transmitted in the same manner (e.g., using the same protocol and/or medium) as was used in transmitting the initiating signal at step S1, or may be transmitted in a different manner, including an alternative wireless protocol indicated as supported by the glasses at step S1.

At step S6, interface device 912 processes the received challenge response. For example, interface device 912 may compare the challenge response to a previously stored (or retrieved) challenge response, and upon finding a match, determine that the user associated with glasses 102 is authentic (e.g., is verified). In at least one embodiment, the interface device 912 may generate a second challenge response associated with the challenge response signal received at step S5b, provide the second challenge response to a remote authentication and verification device, and receive an authentication result from the remote authentication and verification device.

At step S7a, interface device 912 executes a success and/or failure response. In the case that the challenge response signal matches an expected challenge response (or, e.g., interface device 912 receives a success indication from the remote authentication and verification device), a success signal may be transmitted to the associated electronic device 926 at step S7b. The success signal may include identity information identifying the authenticated user, and/or may include associated settings or information associated with the identity of the authenticated user. In an example in which the associated electronic device 926 is a television or cable box, the identity information transmitted in step S7b may allow the television or cable box to determine a channel set authorized for viewing by the authenticated user. In another embodiment, the interface device 912 may be configured to determine the channel set itself and to transmit the channel set to the device 926 at step S7b. In the example of FIGS. 5, 6, and 8, where the associated electronic device 926 is an electronic lock, the success signal transmitted at step S7b may include an unlock signal to cause the electronic lock to disable for a period of time sufficient to allow the authenticated user to pass through into the restricted area. Other examples consistent with the foregoing disclosure are possible as well.

In the event that the challenge response signal processed at step S6 does not match an expected challenge response (or, e.g., interface device 912 receives a failure indication from the remote authentication and verification device), a failure signal may be transmitted to the glasses 102 at step S7c. The failure signal may instruct the user to re-record and/or re-transmit the challenge response, and may indicate a number of re-try attempts remaining before further action is taken relative to the user's identity (e.g., disabling the user's identity for a predetermined period of time, notifying a security administrator, and/or sounding an alarm). Other possibilities exist as well.

Steps S1, S3, and S5 may also involve the negotiation of a security protocol to use for wireless data transmissions between the glasses 102 and interface device 912. For example, the glasses 102 may transmit in step S1 supported wireless security protocols, and the interface device 912 may transmit in step S3b its supported wireless security protocols (which may or may not be a subset of those transmitted in step S1). Alternatively, the interface device 912 may select one of the security protocols transmitted in step S1, and inform the glasses 102 or provide additional parameters or keys relative to the selection in step S3b. Security protocol negotiations could also take place outside of any of the steps denoted in FIG. 9. Possible wireless security protocols may include, but are not limited to, TKIP, EAP, LEAP, PEAP, WPA, AES, and WAPI. The selected security protocol may then be used for future data transmissions.

FIG. 10 illustrates a second message-flow diagram that may be implemented between first glasses 102, second glasses 702, an intermediate display surface 748, and a remote device 1004. The remote device 1004 may be any device associated with glasses 702 or a user of glasses 702, and may include, for example, a personal computer, a laptop, a server computer, a mobile phone, a PDA, or some other electronic device. The remote device 1004 may provide some service to the user of glasses 702, including, for example, a personal address book service, a calendar service, a media storage service, a social networking service, a document storage service, etc. The glasses 702 may be wiredly or wirelessly connected with the remote device 1004. Each of these services may execute a particular function dependent upon identifying and authenticating a user associated with glasses 102. For example, the function may include transmitting and storing authenticated contact information associated with a user of glasses 102, securely associating with an account related to the user of glasses 102 (e.g., a social networking account), or merely receiving an indication that the user of glasses 102 is who he or she says they are (e.g., is authenticated by some third-party service). Other possibilities exist as well.

Because many of the steps set forth in FIG. 10 overlap with those steps already set forth above with respect to FIG. 9, only those steps that vary from what has already been disclosed with respect to FIG. 9 will be discussed in detail going forward.

At step S11 in FIG. 10, glasses 102 transmits an initiating signal onto display medium 704. The initiating signal is a two-dimensional code 746 that may be scanned using a scanning laser (e.g., the first electromagnetic radiation transmission device 118) which may be scanned automatically at a regular periodic interval, at random or semi-random intervals, in response to a software or hardware-generated event at computing device 202, or in response to the first user's manipulation of an input element at glasses 102, among other possibilities. For example, in response to detecting the presence of glasses 702, glasses 102 may display a Transmit 2D Code command 750 in lens 108 of glasses 102, and in response to detecting an input operation corresponding to the command 750, begin transmitting (scanning) the initiating signal at step S1.

The initiating signal may include initial information identifying a user of the glasses 102 encoded within the two-dimensional code 746. The initial identifying information may be, for example, a user name or password associated with the user or the glasses 102, a hardware device ID associated with the glasses 102 or computing device 202, an e-mail address associated with the user, and/or a user account identifier associated with the user, among other possibilities.

Furthermore, the initiating signal (or some subsequent signal from the glasses 102) may describe additional communications capabilities of the glasses 102 that the glasses 702 may consider using in future communications with the glasses 102. For example, the glasses 102 may also encode within the two-dimensional code 746 a Bluetooth identifier associated with the glasses 102 that the glasses 702 may use to transmit challenge request signals or that the glasses 102 may use to transmit challenge responses. In an embodiment in which the glasses 102 encodes additional communications capabilities into the code 746 in step S1, the glasses 702 may make a determination in step S12 regarding future modes of communication with the glasses 102. For example, if the glasses 102 indicates an additional ability to communicate via Bluetooth, the glasses 702 may determine in step S12 what the best method of communication is (e.g., based on higher bandwidth, lower power consumption, etc.), and may send all subsequent communications to the glasses 102 via the determined best method.

At step S12, glasses 702 reads the initiating signal transmitted onto the intermediate display surface 748 by glasses 102. In one embodiment, glasses 702 may be configured to sense the presence of a two-dimensional code 746 on an intermediate display surface 748 within a field of view of a user, and to automatically read the code without further user intervention. In at least one embodiment, the glasses 102 may display the Read 2D Code command 740 in lens 708 of glasses 702 upon glasses 702 detecting the proximate presence of the glasses 102 or upon glasses 702 detecting the presence of the two-dimensional code 746 within a field of view of the user. In response to detecting user input corresponding to the Read 2D Code command 740, glasses 705 may read the two-dimensional code 746 at step S12.

In response to reading the initiating signal (two-dimensional code 746), the glasses 702 processes the two-dimensional code 746 at step S13. By processing the two-dimensional code 746, glasses 702 may identify a user associated with glasses 102, may derive a challenge request from the two-dimensional code 746 or from some other source, may derive an expected challenge response from the two-dimensional code 746 or from some other source, or may take some other action. The other source may be, for example, a remote authorization and authentication server (e.g., a RADIUS server) that, in response to being provided with an identifier associated with the user and derived from the initiating signal, may then provide a corresponding challenge request and expected challenge response. Glasses 702 may connect with the other source via a wired or wireless connection, which may include one or more base stations, routers, switches, LANs, WLANs, WANs, access points, or other network infrastructure. In another embodiment, the challenge request and expected challenge response may be static and associated with glasses 702, and may not change based on an identity of a user of glasses 102. Other possibilities exist as well.

At step S14*a*, the glasses 702 issues a challenge request, and at step S14*b*, transmits a corresponding challenge request signal to the glasses 102. The challenge request signal may be transmitted to glasses 102 via a directed electromagnetic communication link (such as via a laser or LED-based emitter) or via an omni-directional RF link (such as Bluetooth or IEEE 802.11), among other options, using additional information such as network identifiers, encryption parameters, or keys encoded in the two-dimensional code 746 read in step S12. The challenge signal requests the user to authenticate themselves by providing some additional authentication information via a responsive directed or omni-directional communication.

At step S15, glasses 102 receives and processes the challenge request. Similar to step S4 of FIG. 9, processing may include recording a challenge response or accessing a previously-stored challenge response. Other possibilities exist as well. At steps S16*a* and S16*b*, and similar to steps S5*a* and S5*b* of FIG. 9, the glasses 102 issues the challenge response and transmits the challenge response signal to glasses 702. The challenge response signal may be transmitted in the same manner (e.g., using a two-dimensional code 746 on display surface 748) as was used in transmitting the initiating signal at step S11, or may be transmitted in a different manner, including an alternative protocol indicated as supported by the glasses at step S11. For example, and as illustrated in FIG. 10, in one embodiment the challenge response signal may be transmitted directly to glasses 702 via a directed or omni-directional communication protocol supported by both glasses 102 and 702.

At step S17, glasses 702 processes the received challenge response. For example, glasses 702 may compare the challenge response to a previously stored (or retrieved) challenge response, and upon finding a match, determine that the user associated with glasses 102 is authentic (e.g., is verified). In at least one embodiment, the glasses 702 may generate a second challenge response associated with the challenge response signal received at step S16*b*, provide the second challenge response to a remote authentication and verification device, and receive an authentication result from the remote authentication and verification device.

At step S18*a*, glasses 702 executes a success and/or failure response. In the case that the challenge response signal processed at step S17 matches an expected challenge response (or, e.g., glasses 702 receives a success indication from the remote authentication and verification device), a success signal may be transmitted to the remote device 1004. The success signal may include identity information identifying the authenticated user, and/or may include associated settings or information associated with the identity of the authenticated user. In the case that the challenge response signal processed at step S17 does not match an expected challenge response (or, e.g., glasses 702 receives a failure indication from the remote authentication and verification device), a failure signal may be transmitted to the glasses 102 at step S18*b*. The failure signal may instruct the user to re-record and/or re-transmit the challenge response, and may indicate a number of re-try attempts remaining before the further action is taken relative to the user's identity (e.g., disabling the user's identity for a predetermined period of time, notifying a security administrator, and/or sounding an alarm). Other possibilities exist as well. In at least one embodiment, neither a failure signal nor a success signal is transmitted by glasses 702, but instead, a message is displayed in one of the lenses 708, 710 of glasses 702 indicating whether or not the identity of the user of glasses 102 has been successfully verified (e.g., authenticated).

Steps S14*b* and S16*b* may also involve the negotiation of a security protocol to use for wireless data transmissions between the glasses 102 and glasses 702. For example, the glasses 102 may encode in the two-dimensional code 746 of step S11 supported wireless security protocols, and the glasses 702 may transmit in step S14*b* its supported wireless security protocols (which may or may not be a subset of those transmitted in step S11). Alternatively, the glasses 702 may select one of the security protocols transmitted in step S11, and inform the glasses 102 or provide additional parameters or keys relative to the selection in step S14*b*. Security protocol negotiations could also take place outside of any of the steps denoted in FIG. 10. Possible wireless security protocols may include, but are not limited to, TKIP, EAP, LEAP, PEAP, WPA, AES, and WAPI. The selected security protocol may then be used for future data transmissions.

4. Example Hardware for a Wearable Electronic Device System

Figure 11:
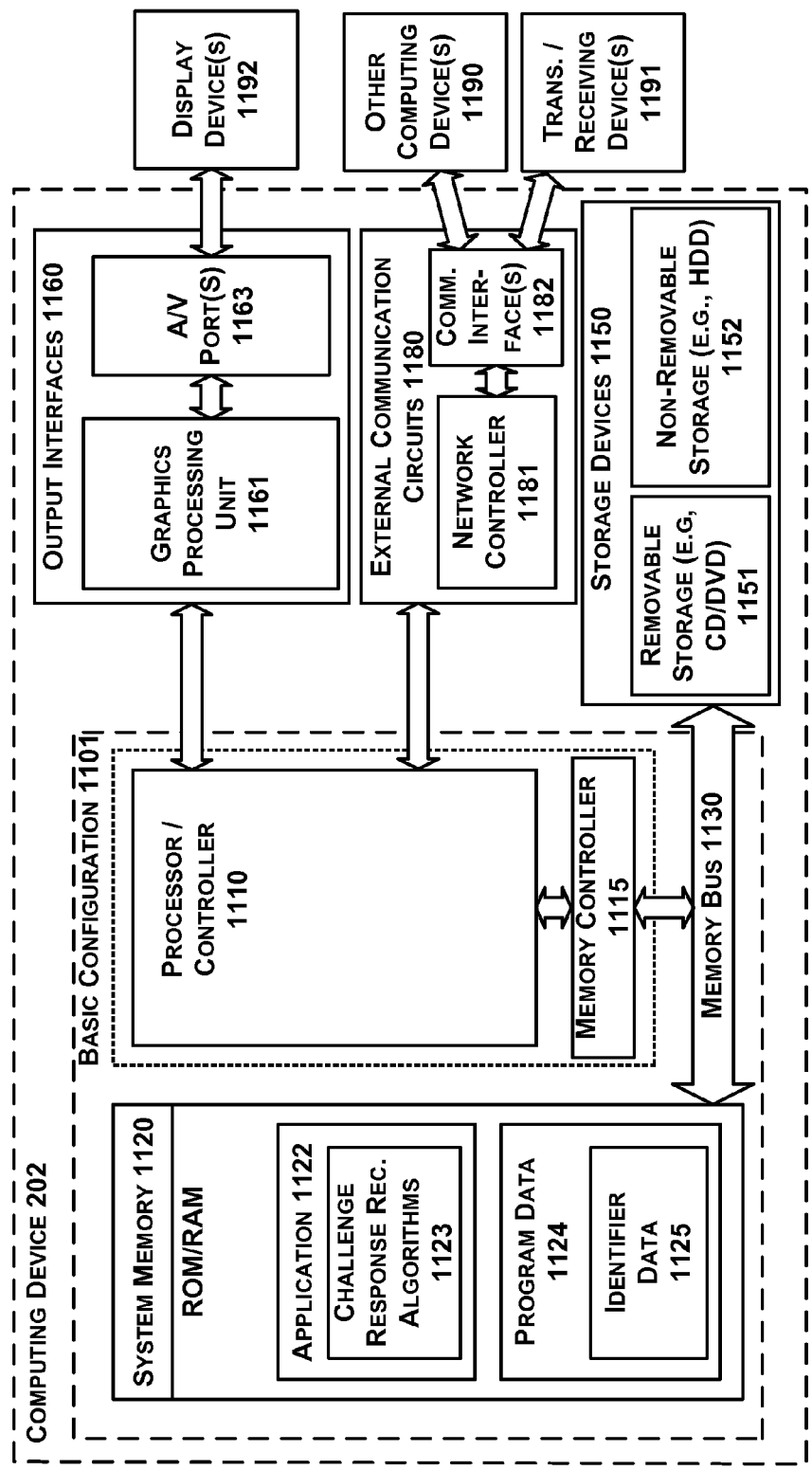
FIG. 11 is a functional block diagram of a computing device for supporting the wearable electronic device system of FIG. 2.

FIG. 11 is a functional block diagram of a computing device 202 for supporting the wearable electronic devices set forth above (e.g., glasses 102, 702) arranged in accordance with at least some embodiments described herein. The computing device 202 may be a personal computer, mobile device, mobile phone, video game system, global positioning system, or other electronic system. In a very basic configuration 1101, computing device 202 may typically include one or more processors or controllers (processor) 1110 and system memory 1120. A memory bus 1130 can be used for communicating between the processor 1110 and the system memory 1120. Depending on the desired configuration, processor 1110 can be of any type including but not limited to a microprocessor (µP), a microcontroller (µC), a digital signal processor (DSP), or any combination thereof. A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 typically includes one or more applications 1122 and program data 1124. Application 1122 may include algorithms such as a challenge response recording algorithm 1123 arranged to record and process a challenge response, in accordance with the present disclosure. Other process descriptions, steps, or blocks in flow or message diagrams in the present disclosure should be understood as potentially representing modules, segments, or portions of code which include one or more executable instructions stored in application memory 1122 for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Program data 1124 may include, among other things, identifier data 1125 that identifies one or more of a user or a wearable electronic device system. In some example embodiments, applications stored in application memory 1122 can be arranged to operate with program data 1124. Computing device 202 can have additional features or functionality, and additional interfaces to facilitate communications between the basic configuration 1101 and any devices and interfaces. For example, the data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

Computer storage media can include volatile and nonvolatile, removable and non-removable media implemented in any method or technology for storage of information, such as computer readable instructions, data structures, program modules, or other data.

System memory 1120, removable storage media for use with removable storage devices 1151, and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 202.

Computing device 202 can also include output interfaces 1160 that may include a graphics processing unit 1161, which can be configured to communicate to various external devices such as display devices 1192 (which may include, for example, projecting devices 302, 306 and/or lenses 108, 110) or speakers via one or more A/V ports 1163. External communication circuits 1180 may include a network controller 1181, which can be arranged to facilitate communications with one or more other computing devices 1190 and/or one or more transmitting and/or receiving devices 1191 (which may include, for example, the first electromagnetic radiation transmission device 118 and/or the first electromagnetic radiation reception device 120). The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, RF, IR, and other wireless media. The term computer readable media as used herein can include both storage media and communication media. The term tangible computer readable media may refer to just the storage media.

Computing device 202 can be implemented as a portion of a small-form factor portable (or mobile) electronic device such as a mobile phone, a multi-chip module (MCM), an application-specific integrated circuit (ASIC), a field-programmable gate array (FPGA), a PDA, a personal media player device, a wireless web-watch device, a personal headset device, an application specific device, or a hybrid device that include any of the above functions. Computing device 202 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 12:
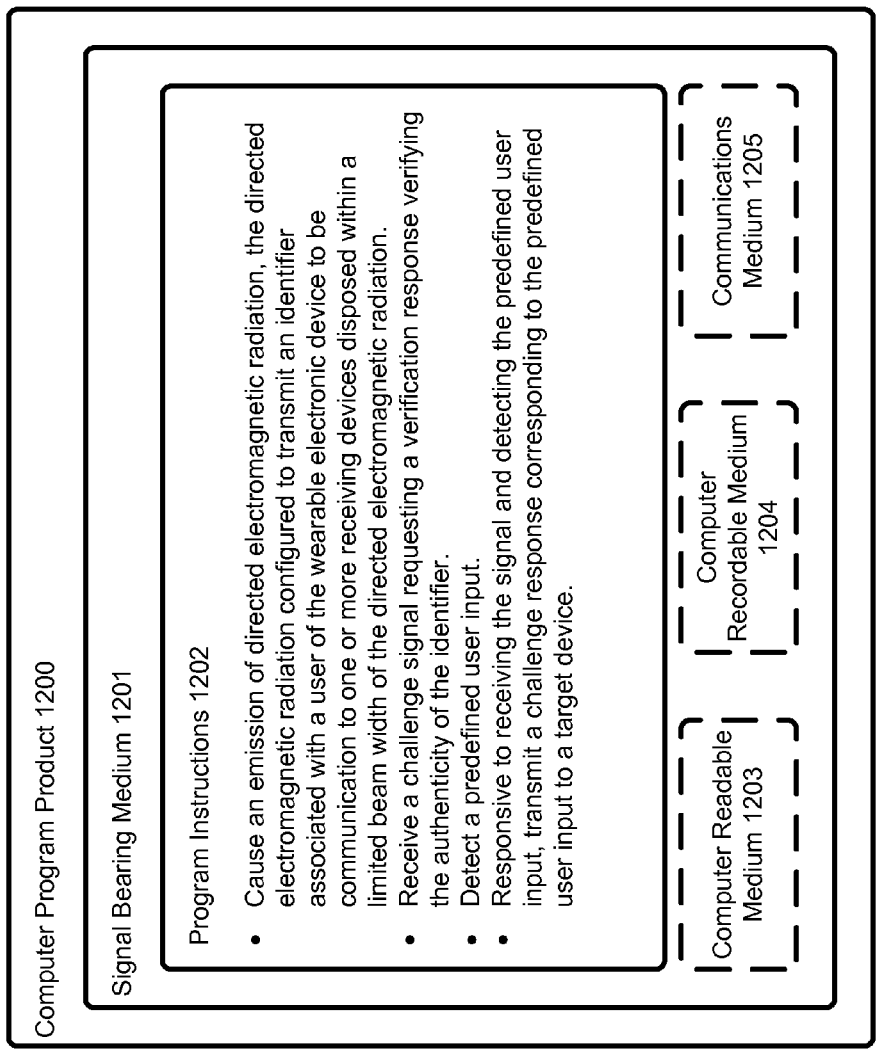
FIG. 12 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 12 is a schematic illustrating a conceptual partial view of an example computer program product 1200 that includes a computer program for executing a computer process on a computing device, arranged according to at least some embodiments presented herein. In one embodiment, the example computer program product 1200 is provided using a signal bearing medium 1201. The signal bearing medium 1201 may include one or more programming instructions 1202 that, when executed by one or more processors, may provide functionality or portions of the functionality described above with respect to FIGS. 1-10. Thus, for example, referring to the embodiments illustrated in FIGS. 9 and 10, one or more features of steps S1, S2, S3a, S3b, S4, S5a, S5b, S6, S7a, S11, S12, S13, S14a, S14b, S15, S16a, S16b, S17, and S18a may be undertaken by one or more instructions associated with the signal bearing medium 1201.

In some examples, the signal bearing medium 1201 may encompass a tangible computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communication link, a wireless communication link, etc.). Thus, for example, the signal bearing medium 1201 may be conveyed by a wireless form of the communications medium 1205 (e.g., a wireless communications medium conforming with the IEEE 802.11 standard or other transmission protocol).

The one or more programming instructions 1202 may be, for example, computer executable and/or logic implemented instructions. In some examples, a computing device such as the computing device 202 of FIG. 11 may be configured to provide various operations, functions, or actions in response to the programming instructions 1202 conveyed to the computing device 202 by one or more of the computer readable medium 1203, the computer recordable medium 1204, and/or the communications medium 1205.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for identifying a user associated with a wearable electronic device, the method comprising:
    transmitting, via a first transmitter coupled to the wearable electronic device, directed electromagnetic radiation comprising an identifier associated with a user of the wearable electronic device;
    aiming the directed electromagnetic radiation at a target electronic device so as to include the target electronic device within a limited beam width of the directed electromagnetic radiation;
    receiving, via a receiver coupled to the wearable electronic device, a challenge signal requesting a verification response verifying the authenticity of the identifier;
    detecting a predefined user input; and
    responsive to receiving the signal and detecting the predefined user input, transmitting a challenge response corresponding to the predefined user input to a target device with a second transmitter.

2. The method of claim 1, wherein the directed electromagnetic radiation comprises a modulated infrared beam emitted from an infrared device.

3. The method of claim 1, wherein the directed electromagnetic radiation comprises radio-frequencies emitted from a directed antenna.

4. The method of claim 1, wherein the directed electromagnetic radiation comprises a laser beam scanned to form a pattern associated with the identifier.

5. The method of claim 1, wherein detecting the predefined user input comprises sensing, via one or more movement sensors, a plurality of movements of the wearable electronic device, and wherein the challenge response corresponds to data representative of the plurality of movements.

6. The method of claim 5, wherein the data representative of the plurality of movements is stored for a predetermined period of time before being transmitted to the target device.

7. The method of claim 5, wherein the data representative of the plurality of movements is intermittently transmitted for a predetermined period of time after being sensed.

8. The method of claim 1, wherein the second transmitter is selected from a Bluetooth transmitter, an IEEE 802.11 transmitter, a WiMAX transmitter, and a cellular transmitter.

9. The method of claim 1, wherein the directed electromagnetic radiation comprises an electromagnetic beam having a radiation width of 120° or less in a horizontal plane.

10. The method of claim 1, wherein the directed electromagnetic radiation comprises a laser beam having a wavelength in the visible spectrum, and
    wherein detecting the predefined user input and transmitting the challenge response comprises transmitting a signal configured to activate a plurality of respectively disposed electromagnetic radiation detectors in a particular order determined by corresponding movements of the wearable electronic device.

11. A wearable electronic device comprising:
    a processor;
    a user input device;
    a first transmitter coupled to the processor and configured to transmit directed electromagnetic radiation;
    a second transmitter coupled to the processor and configured to transmit electromagnetic radiation; and
    a receiver;
    wherein the processor is configured to:
        cause an emission of directed electromagnetic radiation from the first transmitter, the directed electromagnetic radiation configured to transmit an identifier associated with a user of the wearable electronic device to be communication to one or more receiving devices disposed within a limited beam width of the directed electromagnetic radiation;
        detect a predefined user input via the user input device; and
        responsive to receiving a challenge signal requesting a verification response verifying an authenticity of the identifier, cause a challenge response corresponding to the predefined user input to be transmitted by the second transmitter.

12. The device of claim 11, wherein the first transmitter is a directed infrared (IR) transmitter and the receiver is a directed IR receiver.

13. The device of claim 11, wherein the first transmitter is a visible-spectrum laser transmitter.

14. The device of claim 11, wherein the receiver is a short-range wireless receiver selected from the group consisting of IEEE 802.11, Bluetooth, and ZigBee.

15. The device of claim 11, wherein the second transmitter is configured to transmit short-range wireless radiation.

16. The device of claim 11, wherein the first transmitter is an infrared (IR) device and the directed electromagnetic radiation comprises a modulated infrared beam emitted from the IR device.

17. The device of claim 11, wherein the first transmitter is a visible-spectrum laser and the directed electromagnetic radiation comprises a laser beam scanned to form a pattern associated with the identifier.

18. The device of claim 11, wherein the user input device comprises one or more movement sensors configured to track a movement of a wearer of the device; and wherein the processor is configured to detect the predefined user input by receiving, via the one or more movement sensors, indications of a plurality of movements of the device, and wherein the challenge response corresponds to data representative of the plurality of movements.

19. The device of claim 18, wherein the processor is configured to cause the data representative of the plurality of movements to be stored for a predetermined period of time before being transmitted.

20. The device of claim 19, wherein the processor is configured to cause the data representative of the plurality of movements to be intermittently transmitted for a predetermined period of time after being received.

* * * * *